(12) United States Patent
Havemose

(10) Patent No.: US 11,314,560 B1
(45) Date of Patent: *Apr. 26, 2022

(54) SYSTEM AND METHOD FOR HIERARCHICAL INTERCEPTION WITH ISOLATED ENVIRONMENTS

(71) Applicant: OPEN INVENTION NETWORK LLC, Durham, NC (US)

(72) Inventor: Allan Havemose, Arroyo Grande, CA (US)

(73) Assignee: OPEN INVENTION NETWORK LLC, Durham, NC (US)

( * ) Notice: Subject to any disclaimer, the term of this patent is extended or adjusted under 35 U.S.C. 154(b) by 219 days.

This patent is subject to a terminal disclaimer.

(21) Appl. No.: 16/709,856

(22) Filed: Dec. 10, 2019

Related U.S. Application Data

(63) Continuation of application No. 16/006,103, filed on Jun. 12, 2018, now Pat. No. 10,503,563, which is a continuation of application No. 15/201,956, filed on Jul. 5, 2016, now Pat. No. 9,996,399, which is a continuation of application No. 14/606,093, filed on Jan. 27, 2015, now Pat. No. 9,384,347, which is a continuation of application No. 13/862,979, filed on Apr. 15, 2013, now Pat. No. 8,943,501, which is a continuation of application No. 12/813,618, filed on Jun. 11, 2010, now Pat. No. 8,464,256, which is a
(Continued)

(51) Int. Cl.
| | |
|---|---|
| *G06F 9/50* | (2006.01) |
| *G06F 11/20* | (2006.01) |
| *G06F 9/52* | (2006.01) |
| *G06F 21/53* | (2013.01) |
| *G06F 9/455* | (2018.01) |
| *G06F 9/48* | (2006.01) |
| *G06F 9/54* | (2006.01) |
| *G06F 11/00* | (2006.01) |
| *G06F 8/61* | (2018.01) |

(52) U.S. Cl.
CPC ............ *G06F 9/5088* (2013.01); *G06F 9/455* (2013.01); *G06F 9/4856* (2013.01); *G06F 9/52* (2013.01); *G06F 9/522* (2013.01); *G06F 9/54* (2013.01); *G06F 11/008* (2013.01); *G06F 11/203* (2013.01); *G06F 11/2023* (2013.01); *G06F 21/53* (2013.01); *G06F 8/61* (2013.01); *G06F 8/62* (2013.01); *G06F 2009/4557* (2013.01)

(58) Field of Classification Search
None
See application file for complete search history.

(56) References Cited

U.S. PATENT DOCUMENTS

| | | |
|---|---|---|
| 5,047,928 A | 9/1991 | Wiedemer |
| 5,155,680 A | 10/1992 | Wiedemer |
| 5,325,290 A | 6/1994 | Cauffman et al. |

(Continued)

OTHER PUBLICATIONS

Zhao et al. "Experimental Study of Virtual Machine Migration in Support of Reservation of Cluster Resources", 2007.

*Primary Examiner* — Qing Yuan Wu

(57) ABSTRACT

An operation comprising one or more of loading one or more primary applications and including said one or more primary applications in a synchronization point, halting execution of said one or more primary applications upon arriving at said synchronization point, triggering a migration of said one or more primary applications to one or more backup applications, wherein said migration starts when the execution of said one or more primary applications are halted at said synchronization point.

19 Claims, 14 Drawing Sheets

Related U.S. Application Data continuation of application No. 12/421,691, filed on Apr. 10, 2009, now Pat. No. 8,341,631.

(56) References Cited

U.S. PATENT DOCUMENTS

| | | |
|---|---|---|
| 5,386,369 A | 1/1995 | Christiano |
| 5,553,239 A | 9/1996 | Heath et al. |
| 5,708,709 A | 1/1998 | Rose |
| 5,951,650 A | 9/1999 | Bell et al. |
| 5,996,016 A | 11/1999 | Thalheimer et al. |
| 6,026,499 A | 2/2000 | Shirakihara et al. |
| 6,085,086 A | 7/2000 | Porta et al. |
| 6,144,999 A | 11/2000 | Khalidi et al. |
| 6,189,111 B1 | 2/2001 | Alexander et al. |
| 6,269,442 B1 | 7/2001 | Oberhauser et al. |
| 6,314,567 B1 | 11/2001 | Oberhauser et al. |
| 6,321,275 B1 | 11/2001 | McQuistan et al. |
| 6,496,847 B1 | 12/2002 | Bugnion et al. |
| 6,560,626 B1 | 5/2003 | Hogle et al. |
| 6,574,618 B2 | 6/2003 | Eylon et al. |
| 6,601,081 B1 | 7/2003 | Provino et al. |
| 6,615,217 B2 | 9/2003 | Rosensteel, Jr. et al. |
| 6,718,538 B1 | 4/2004 | Mathiske |
| 6,766,314 B2 | 7/2004 | Burnett |
| 6,766,471 B2 | 7/2004 | Meth |
| 6,795,966 B1 | 9/2004 | Lim et al. |
| 6,918,113 B2 | 7/2005 | Patel et al. |
| 6,944,785 B2 | 9/2005 | Gadir et al. |
| 6,954,784 B2 | 10/2005 | Aiken et al. |
| 6,964,034 B1 | 11/2005 | Snow |
| 7,028,305 B2 | 4/2006 | Schaefer |
| 7,043,524 B2 | 5/2006 | Shah et al. |
| 7,058,696 B1 | 6/2006 | Phillips et al. |
| 7,076,555 B1 | 7/2006 | Orman et al. |
| 7,082,551 B2 | 7/2006 | Lawrance et al. |
| 7,089,294 B1 | 8/2006 | Baskey et al. |
| 7,093,086 B1 | 8/2006 | Rietschote |
| 7,152,119 B2 | 12/2006 | Na et al. |
| 7,197,700 B2 | 3/2007 | Honda et al. |
| 7,207,039 B2 | 4/2007 | Komarla et al. |
| 7,213,246 B1 | 5/2007 | Rietschote et al. |
| 7,257,811 B2 | 8/2007 | Hunt et al. |
| 7,269,645 B2 | 9/2007 | Goh et al. |
| 7,293,200 B2 | 11/2007 | Neary et al. |
| 7,363,365 B2 | 4/2008 | Ocko et al. |
| 7,386,855 B2 | 6/2008 | Song et al. |
| 7,467,370 B2 | 12/2008 | Proudler et al. |
| 7,506,194 B2 | 3/2009 | Appanna et al. |
| 7,509,406 B2 | 3/2009 | Abdo et al. |
| 7,512,815 B1 | 3/2009 | Munetoh |
| 7,523,344 B2 | 4/2009 | Qiao et al. |
| 7,526,452 B2 | 4/2009 | Agarwal et al. |
| 7,543,182 B2 | 6/2009 | Branda et al. |
| 7,549,042 B2 | 6/2009 | Glaum et al. |
| 7,552,239 B2 | 6/2009 | Jean et al. |
| 7,562,220 B2 | 7/2009 | Frank et al. |
| 7,613,921 B2 | 11/2009 | Scaralata |
| 7,627,902 B1 | 12/2009 | Rive et al. |
| 7,664,711 B2 | 2/2010 | Agarwal et al. |
| 7,672,882 B2 | 3/2010 | Agarwal et al. |
| 7,673,308 B2 | 3/2010 | McMillan et al. |
| 7,680,758 B2 | 3/2010 | Laborczfalvi et al. |
| 7,681,075 B2 | 3/2010 | Havemose et al. |
| 7,693,835 B2 | 4/2010 | Ohta et al. |
| 7,694,123 B2 | 4/2010 | Prasse et al. |
| 7,711,847 B2 | 5/2010 | Dhupelia et al. |
| 7,716,240 B2 | 5/2010 | Lim |
| 7,751,311 B2 | 7/2010 | Ramaiah et al. |
| 7,761,573 B2 | 7/2010 | Travostino et al. |
| 7,770,169 B2 | 8/2010 | Fresko et al. |
| 7,774,636 B2 | 8/2010 | Rao et al. |
| 7,801,135 B2 | 9/2010 | Appanna et al. |
| 7,877,781 B2 | 1/2011 | Lim |
| 7,945,688 B1 | 5/2011 | Lango et al. |
| 8,019,860 B2 | 9/2011 | Ivanov et al. |
| 8,024,815 B2 | 9/2011 | Lorch et al. |
| 8,095,662 B1 | 1/2012 | Lappas et al. |
| 8,104,085 B2 | 1/2012 | Fresko et al. |
| 8,108,429 B2 | 1/2012 | Sim-Tang et al. |
| 8,108,722 B1 | 1/2012 | Havemose et al. |
| 8,122,280 B2 | 2/2012 | Ngan et al. |
| 8,171,483 B2 | 5/2012 | Nord et al. |
| 8,176,364 B1 | 5/2012 | Havemose |
| 8,191,001 B2 | 5/2012 | Wie et al. |
| 8,195,722 B1 | 6/2012 | Havemose et al. |
| 8,281,317 B1 | 10/2012 | Backensto et al. |
| 8,307,177 B2 | 11/2012 | Prahlad et al. |
| 8,831,995 B2 | 9/2014 | Holler et al. |
| 10,212,147 B2 | 2/2019 | Buendgen et al. |
| 2002/0056004 A1 | 5/2002 | Smith et al. |
| 2002/0065945 A1 | 5/2002 | Calder et al. |
| 2002/0091763 A1 | 7/2002 | Shah et al. |
| 2002/0109718 A1 | 8/2002 | Mansour et al. |
| 2002/0111995 A1 | 8/2002 | Mansour et al. |
| 2002/0129096 A1 | 9/2002 | Mansour et al. |
| 2002/0152382 A1 | 10/2002 | Xiao |
| 2002/0157089 A1 | 10/2002 | Patel et al. |
| 2002/0161826 A1 | 10/2002 | Arteaga et al. |
| 2002/0161908 A1 | 10/2002 | Benitez et al. |
| 2002/0174265 A1 | 11/2002 | Schmidt |
| 2003/0004882 A1 | 1/2003 | Holler et al. |
| 2003/0009538 A1 | 1/2003 | Shah et al. |
| 2003/0056200 A1 | 3/2003 | Li et al. |
| 2003/0074580 A1 | 4/2003 | Knouse et al. |
| 2003/0120593 A1 | 6/2003 | Bansal et al. |
| 2003/0236906 A1 | 12/2003 | Klemets et al. |
| 2004/0003101 A1 | 1/2004 | Roth et al. |
| 2004/0055004 A1 | 3/2004 | Sun et al. |
| 2004/0083369 A1 | 4/2004 | Erlingsson et al. |
| 2004/0153700 A1 | 8/2004 | Nixon et al. |
| 2004/0167984 A1 | 8/2004 | Herrmann |
| 2004/0267645 A1 | 12/2004 | Pollari |
| 2005/0071824 A1 | 3/2005 | N. et al. |
| 2005/0172082 A1 | 8/2005 | Liu et al. |
| 2005/0193139 A1 | 9/2005 | Vinson et al. |
| 2005/0216415 A1 | 9/2005 | Stefik et al. |
| 2006/0015764 A1 | 1/2006 | Ocko et al. |
| 2006/0031547 A1 | 2/2006 | Tsui et al. |
| 2006/0053228 A1 | 3/2006 | Rachman et al. |
| 2006/0069692 A1 | 3/2006 | Pemia |
| 2006/0075381 A1 | 4/2006 | Laborczfalvi et al. |
| 2006/0156403 A1 | 7/2006 | Haeffele et al. |
| 2006/0177010 A1 | 8/2006 | Skakkebaek et al. |
| 2006/0177023 A1 | 8/2006 | Vaghar et al. |
| 2006/0206873 A1 | 9/2006 | Argade |
| 2006/0277305 A1 | 12/2006 | Bernardin et al. |
| 2006/0294235 A1 | 12/2006 | Joseph |
| 2007/0007336 A1 | 1/2007 | Kindberg |
| 2007/0028110 A1 | 2/2007 | Brennan |
| 2007/0028302 A1 | 2/2007 | Brennan et al. |
| 2007/0028303 A1 | 2/2007 | Brennan |
| 2007/0028304 A1 | 2/2007 | Brennan |
| 2007/0083501 A1 | 4/2007 | Pedersen et al. |
| 2007/0083522 A1 | 4/2007 | Nord et al. |
| 2007/0083610 A1 | 4/2007 | Trader et al. |
| 2007/0083655 A1 | 4/2007 | Pedersen |
| 2007/0101124 A1 | 5/2007 | Pitts |
| 2007/0150584 A1 | 6/2007 | Srinivasan |
| 2007/0171921 A1 | 7/2007 | Wookey et al. |
| 2007/0192518 A1 | 8/2007 | Rupanagunta et al. |
| 2007/0244987 A1 | 10/2007 | Pedersen et al. |
| 2007/0245334 A1 | 10/2007 | Nieh et al. |
| 2007/0248085 A1 | 10/2007 | Volpano |
| 2007/0277056 A1 | 11/2007 | Varadarajan et al. |
| 2007/0294578 A1 | 12/2007 | Qiao et al. |
| 2008/0028086 A1 | 1/2008 | Chetuparambil et al. |
| 2008/0098006 A1 | 4/2008 | Pedersen et al. |
| 2008/0133764 A1 | 6/2008 | Agarwal et al. |
| 2008/0184218 A1 | 7/2008 | Largman et al. |
| 2008/0195824 A1 | 8/2008 | Sadovsky et al. |
| 2008/0235119 A1 | 9/2008 | Agarwal et al. |
| 2008/0295114 A1 | 11/2008 | Argade et al. |
| 2009/0028576 A1 | 1/2009 | Elahmadi et al. |
| 2009/0089406 A1 | 4/2009 | Roush et al. |

(56) References Cited

U.S. PATENT DOCUMENTS

| | | |
|---|---|---|
| 2009/0100420 A1 | 4/2009 | Sapuntzakis et al. |
| 2009/0106256 A1 | 4/2009 | Safari et al. |
| 2009/0106424 A1 | 4/2009 | Safari et al. |
| 2009/0106780 A1 | 4/2009 | Nord et al. |
| 2009/0133013 A1 | 5/2009 | Criddle et al. |
| 2009/0150885 A1 | 6/2009 | Safari et al. |
| 2009/0164994 A1 | 6/2009 | Vasilevsky et al. |
| 2009/0199175 A1 | 8/2009 | Keller et al. |
| 2009/0199177 A1 | 8/2009 | Edwards et al. |
| 2009/0228576 A1 | 9/2009 | Rosenan et al. |
| 2009/0235191 A1 | 9/2009 | Garbow et al. |
| 2009/0241108 A1 | 9/2009 | Edwards et al. |
| 2009/0254900 A1 | 10/2009 | Nakamura |
| 2009/0292654 A1 | 11/2009 | Katiyar et al. |
| 2009/0300032 A1 | 12/2009 | Chirlian et al. |
| 2009/0300605 A1 | 12/2009 | Edwards et al. |
| 2009/0310663 A1 | 12/2009 | Menon et al. |
| 2009/0313363 A1 | 12/2009 | Parsons et al. |
| 2010/0023996 A1 | 1/2010 | Sabin et al. |
| 2010/0031325 A1 | 2/2010 | Maigne et al. |
| 2010/0037232 A1 | 2/2010 | Lee et al. |
| 2010/0057833 A1 | 3/2010 | DeHaan |
| 2010/0057890 A1 | 3/2010 | DeHaan |
| 2010/0071035 A1 | 3/2010 | Budko et al. |
| 2010/0088699 A1 | 4/2010 | Sasaki |
| 2010/0107158 A1 | 4/2010 | Chen et al. |
| 2010/0118324 A1 | 5/2010 | Tagawa |
| 2010/0235433 A1 | 9/2010 | Ansari et al. |
| 2011/0107406 A1 | 5/2011 | Frost et al. |
| 2011/0119748 A1 | 5/2011 | Edwards et al. |
| 2011/0126192 A1 | 5/2011 | Frost et al. |
| 2011/0191414 A1 | 8/2011 | Ma et al. |
| 2011/0208908 A1 | 8/2011 | Chou et al. |
| 2012/0054486 A1 | 3/2012 | Lakkavalli et al. |
| 2012/0084394 A1 | 4/2012 | Yeates et al. |
| 2012/0088470 A1 | 4/2012 | Raleigh |
| 2015/0235015 A1 | 8/2015 | Holler et al. |

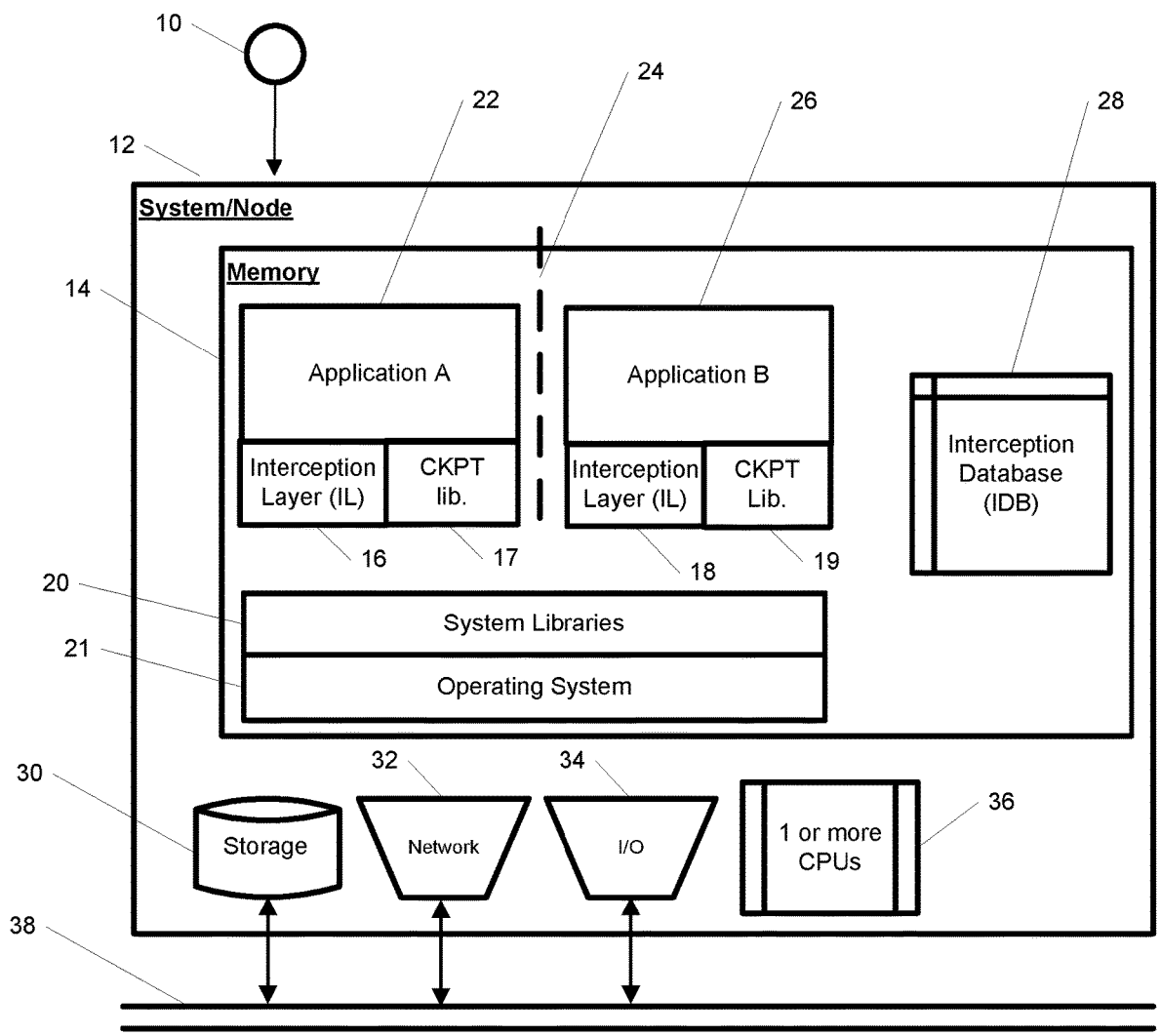
FIG.1 – System Overview

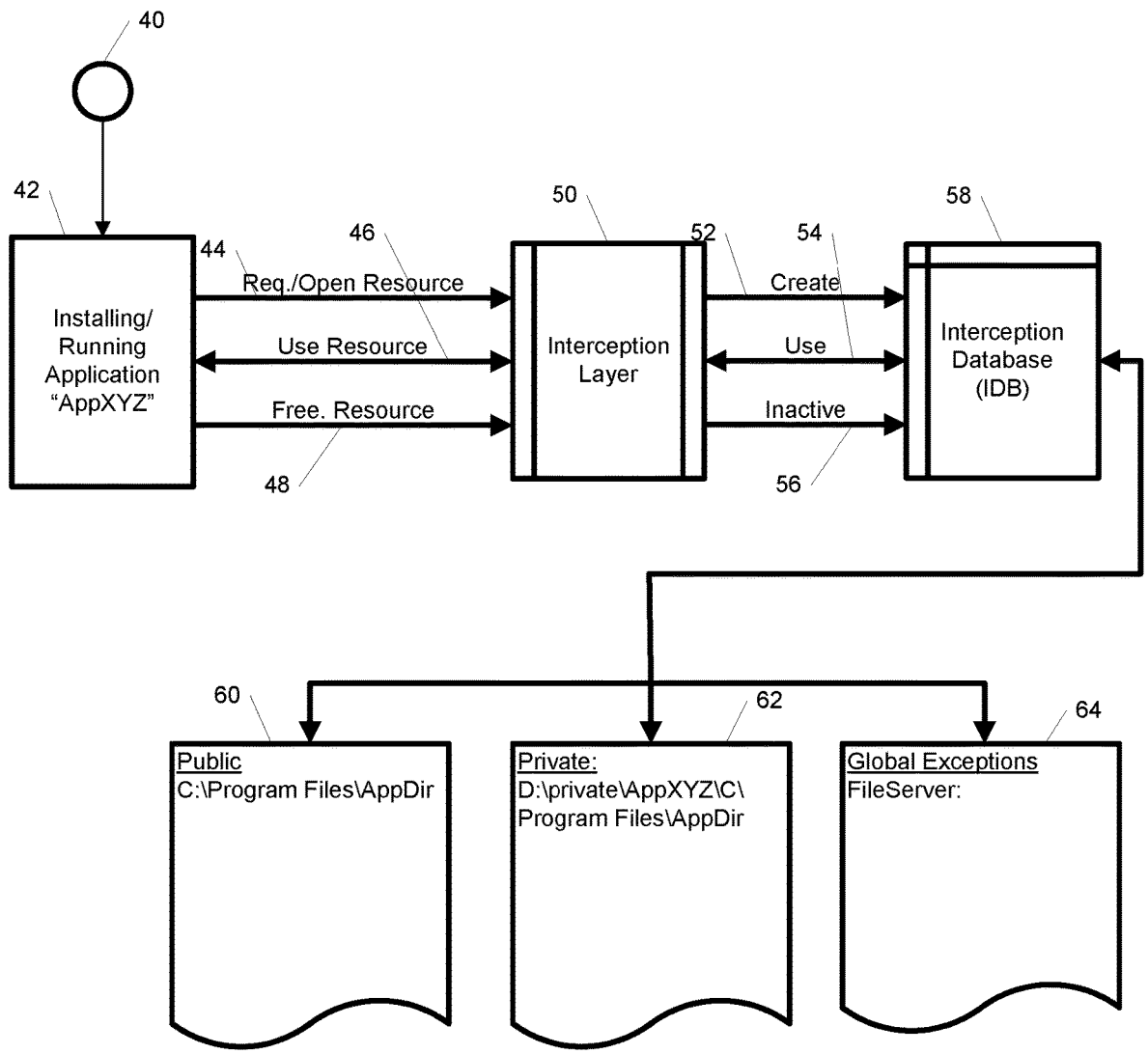
FIG.2 – Installing and running an Application

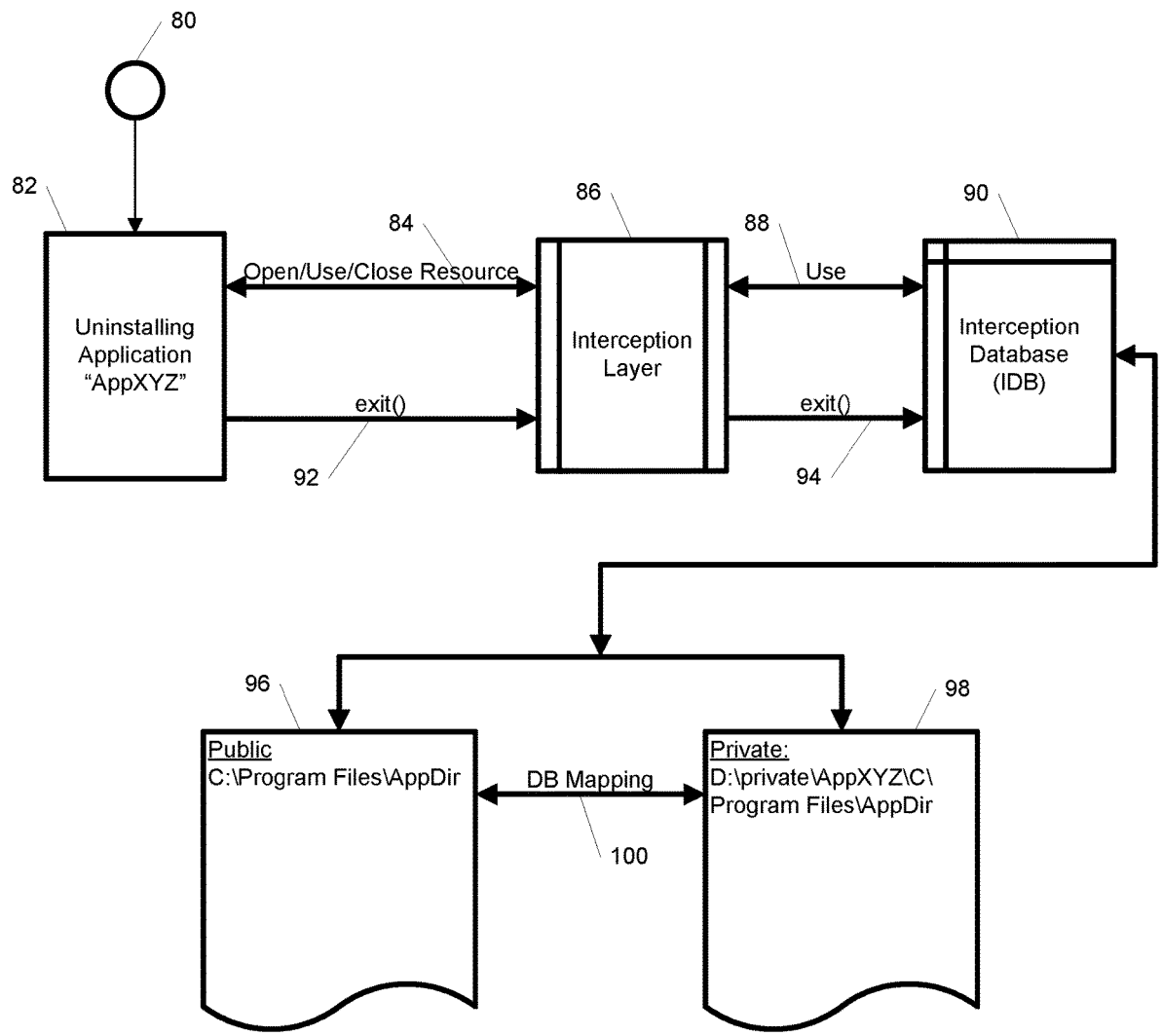
FIG.3 – Un-Installing an Application

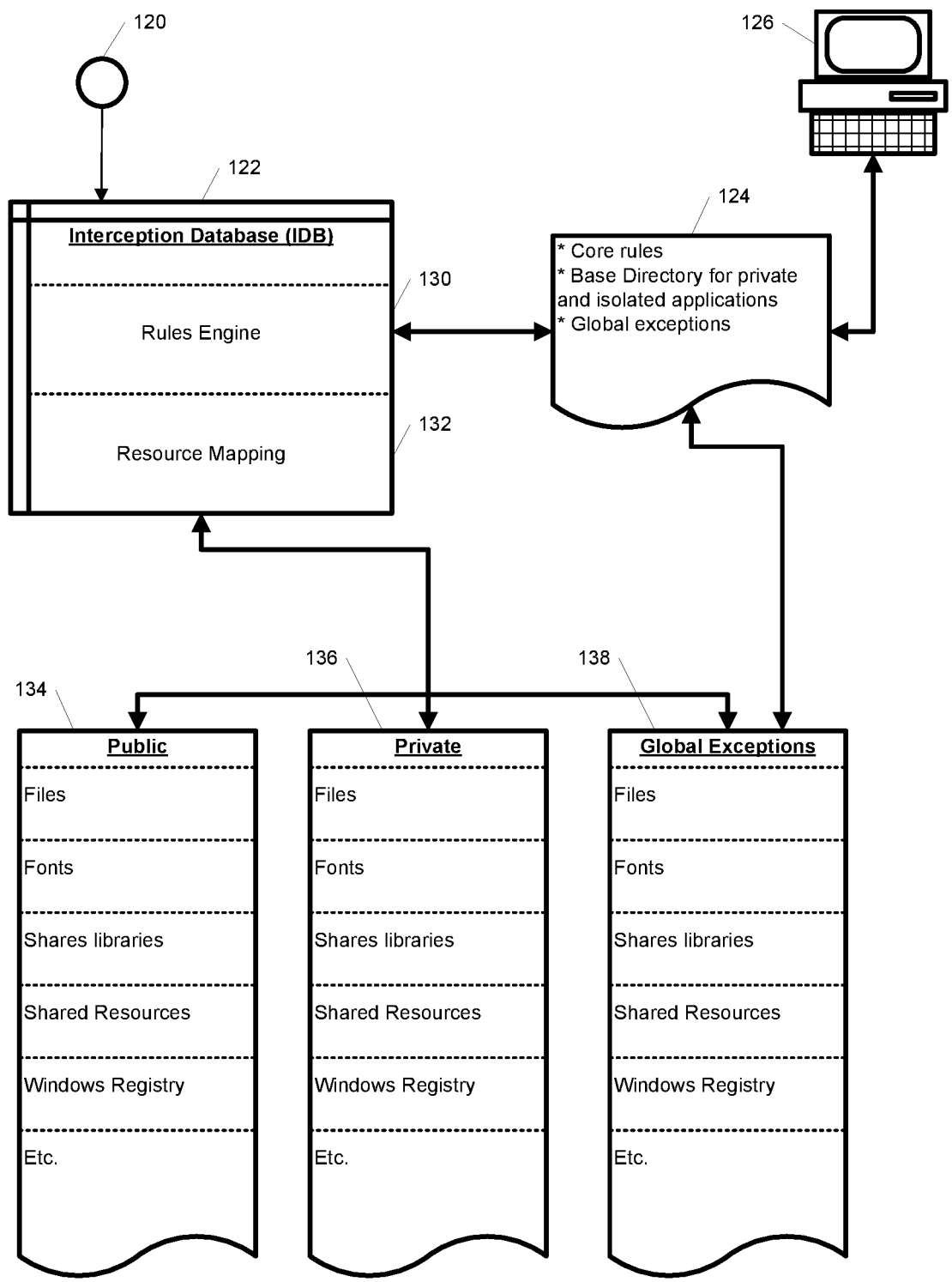
FIG.4 – Interception Database (IDB)

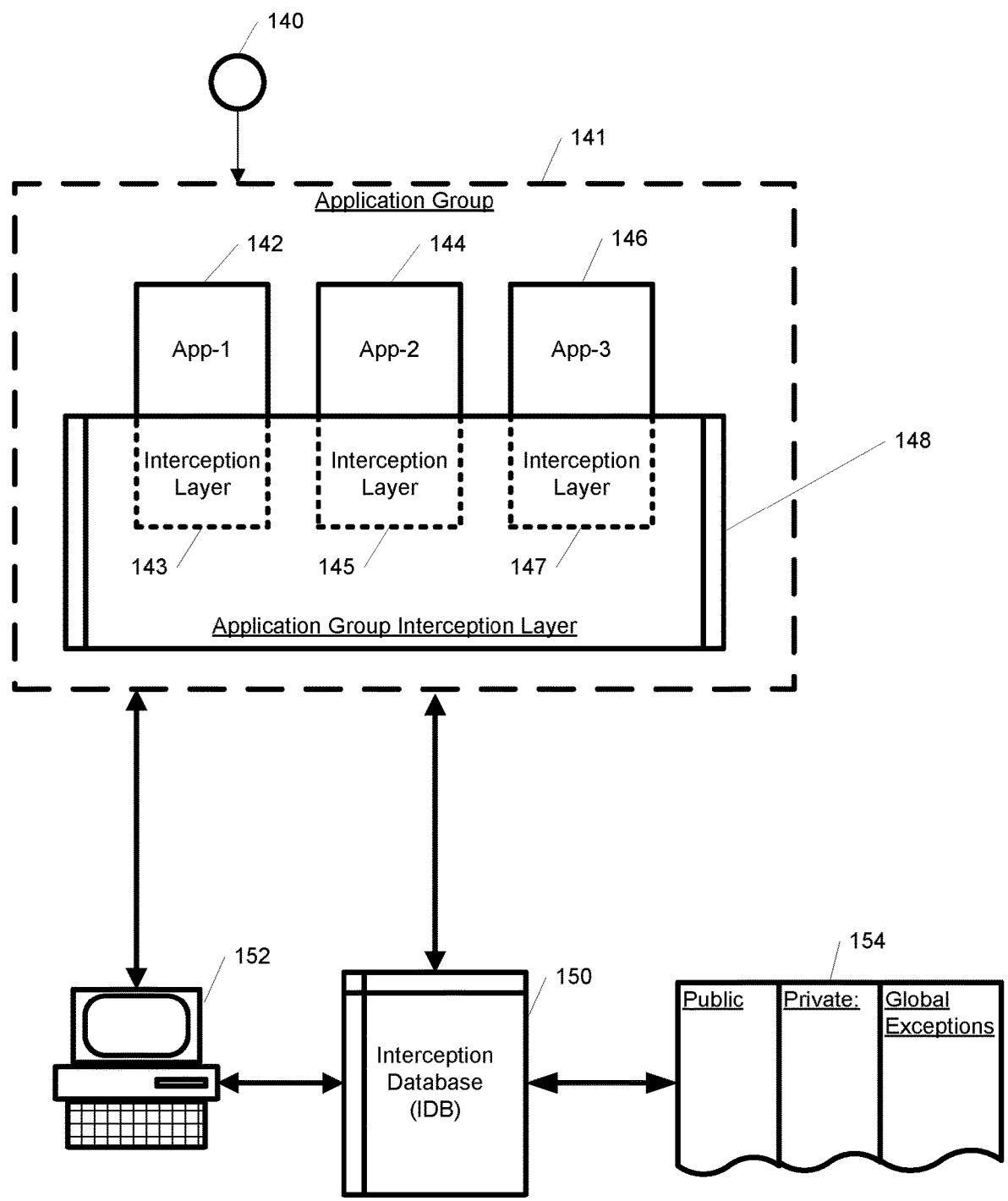
FIG.5 – Application Groups

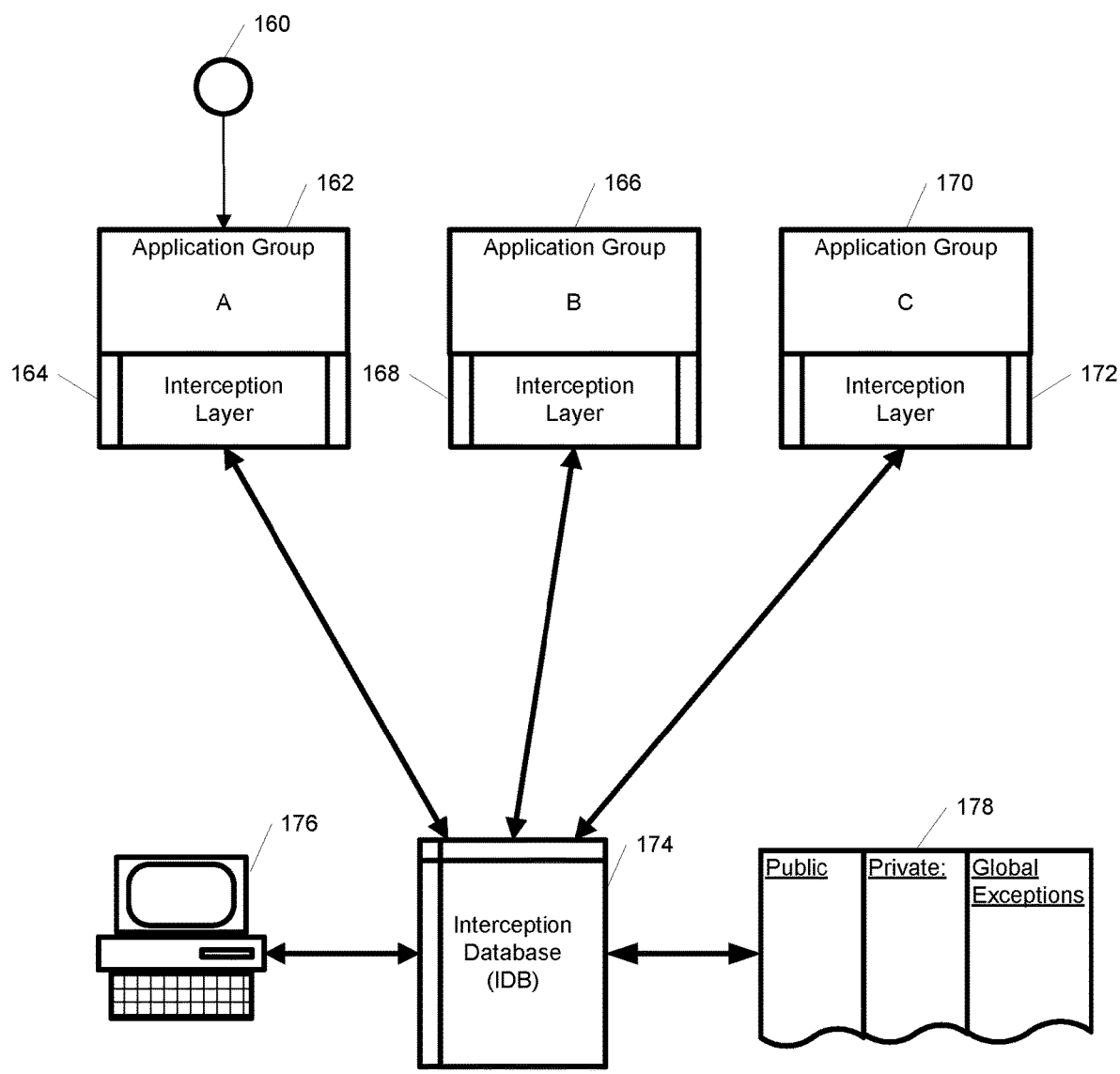
FIG.6 — Multiple Application Groups

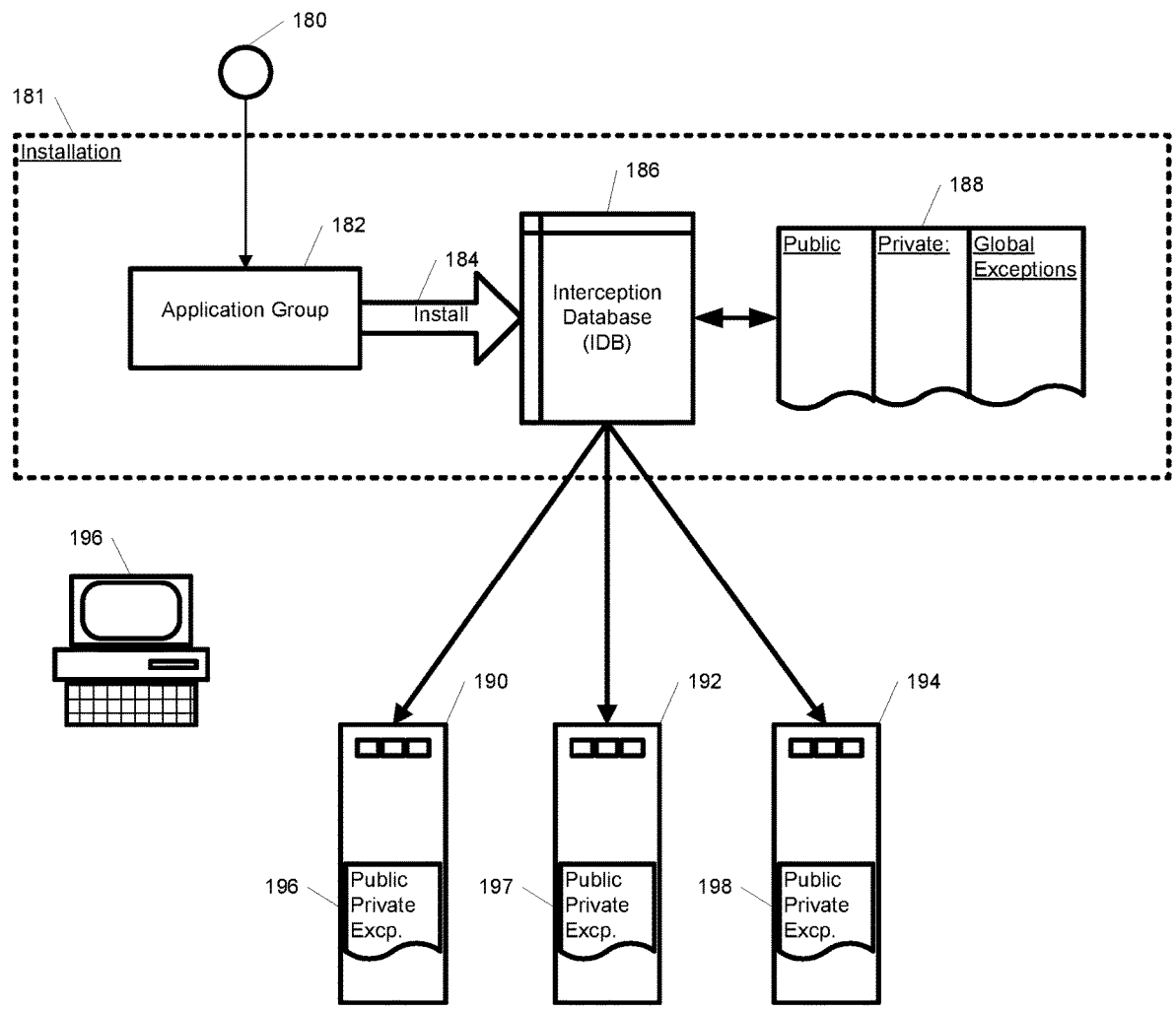
FIG.7 – Installation free deployment

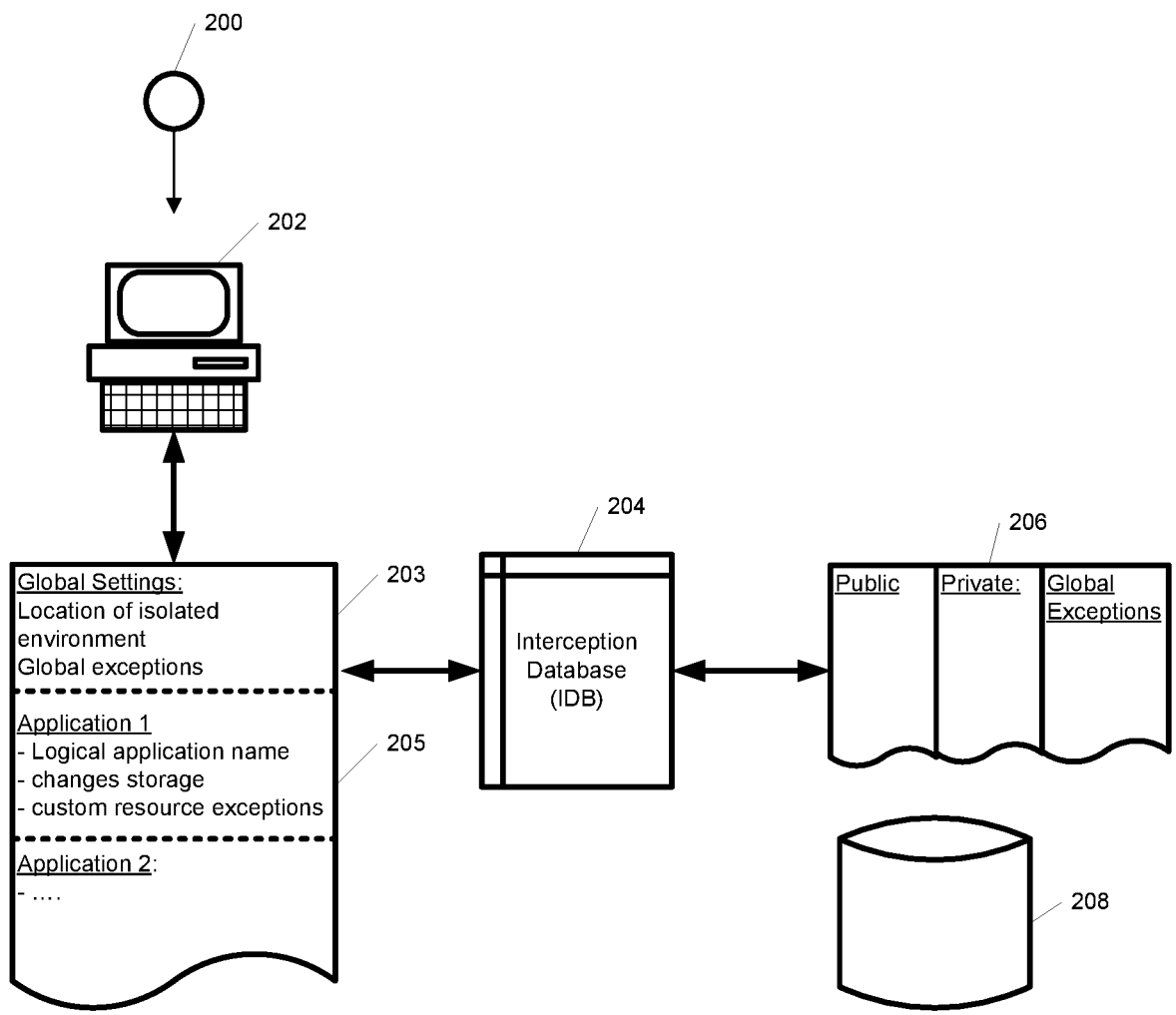
FIG.8 — Administration

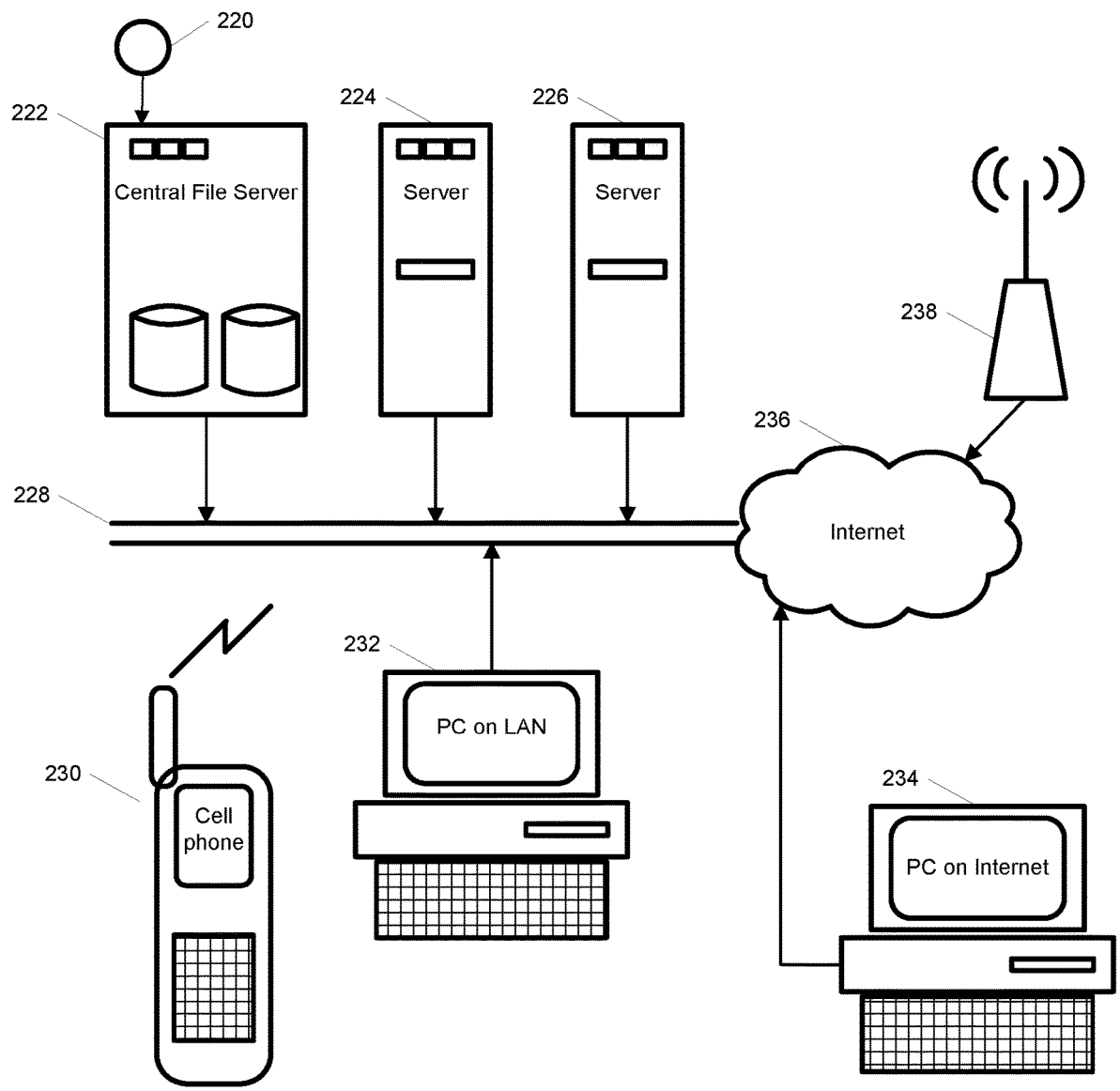
Fig.9 – Deployment scenarios

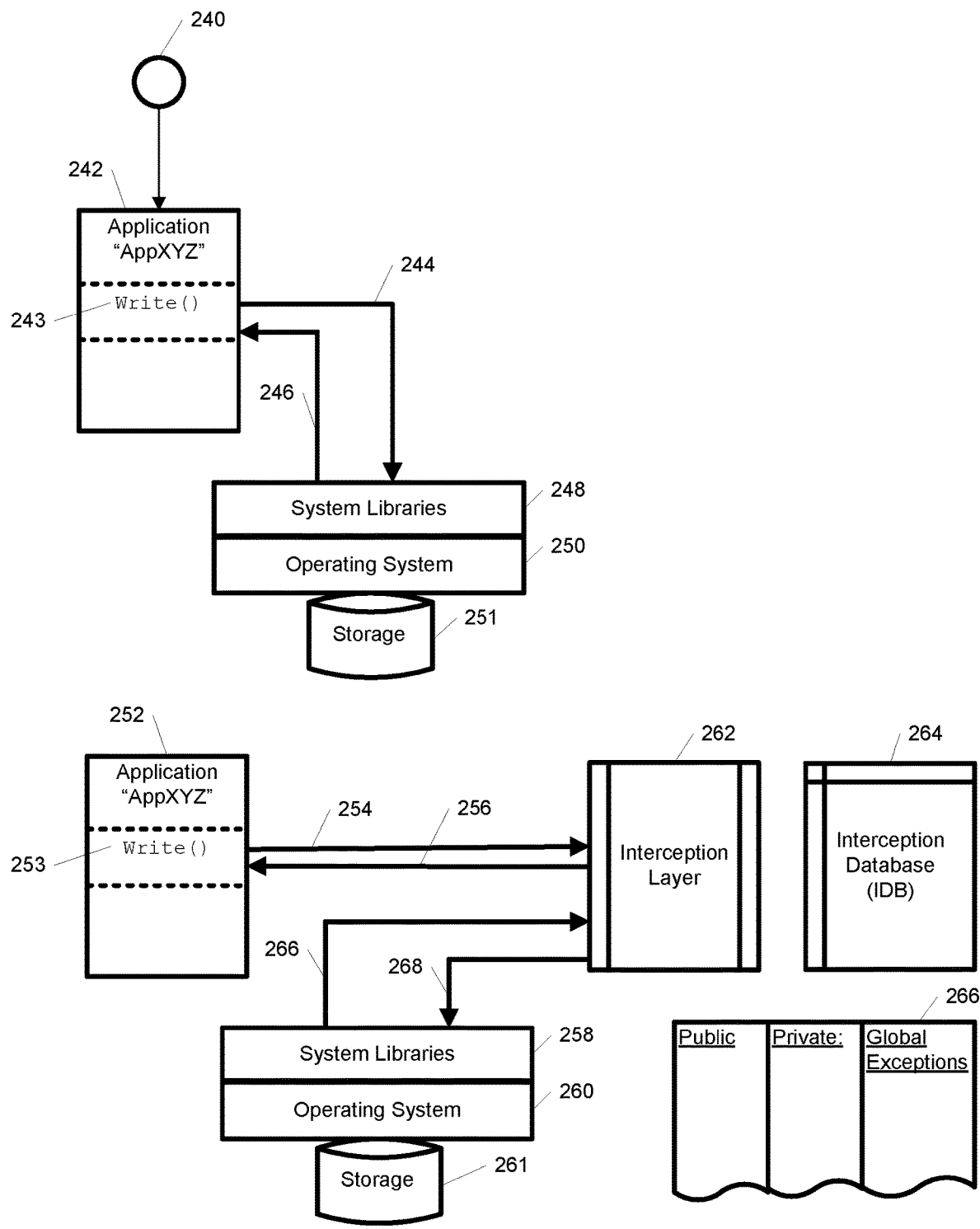
FIG.10 – Detailed control and dataflow

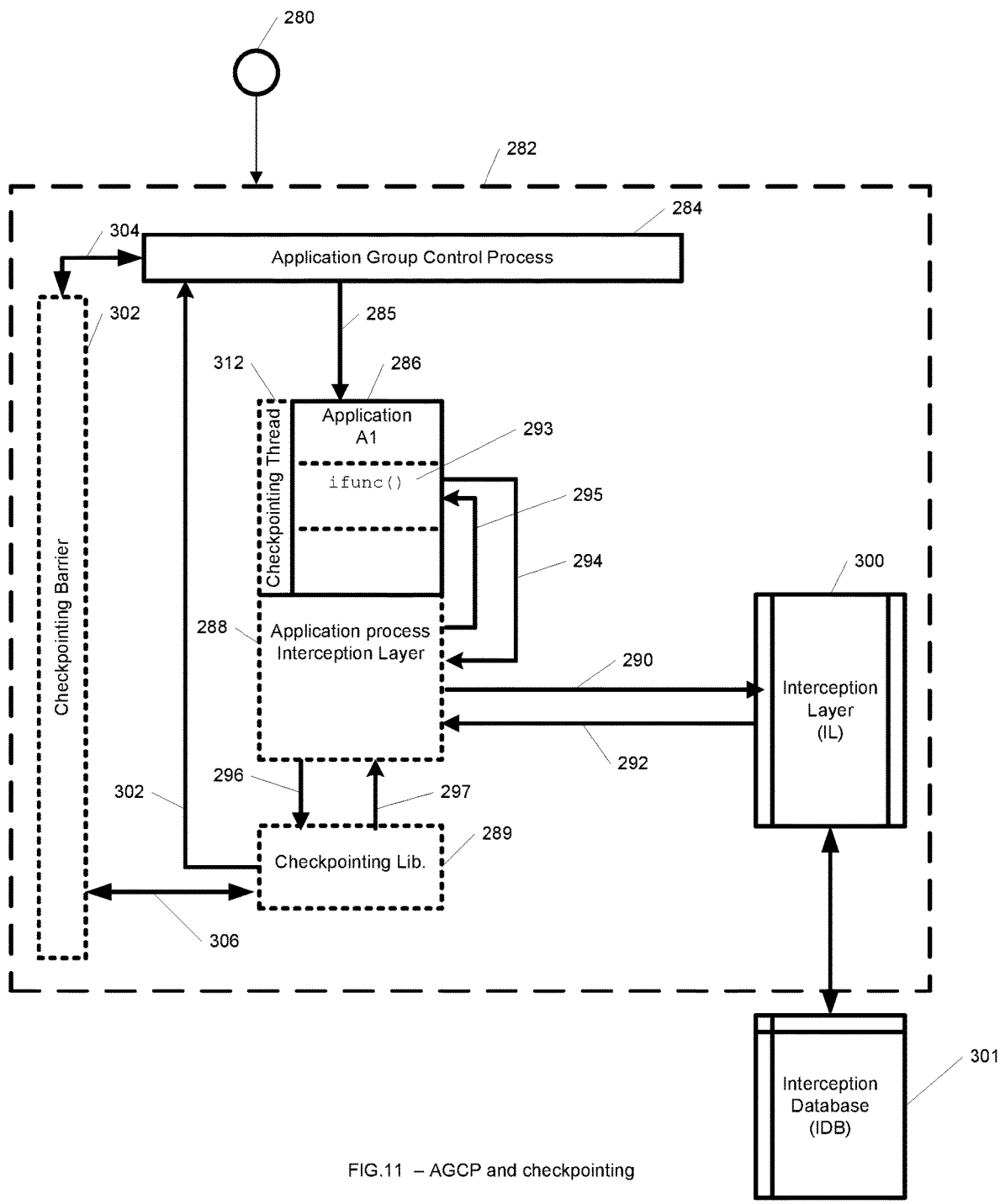
FIG.11 – AGCP and checkpointing

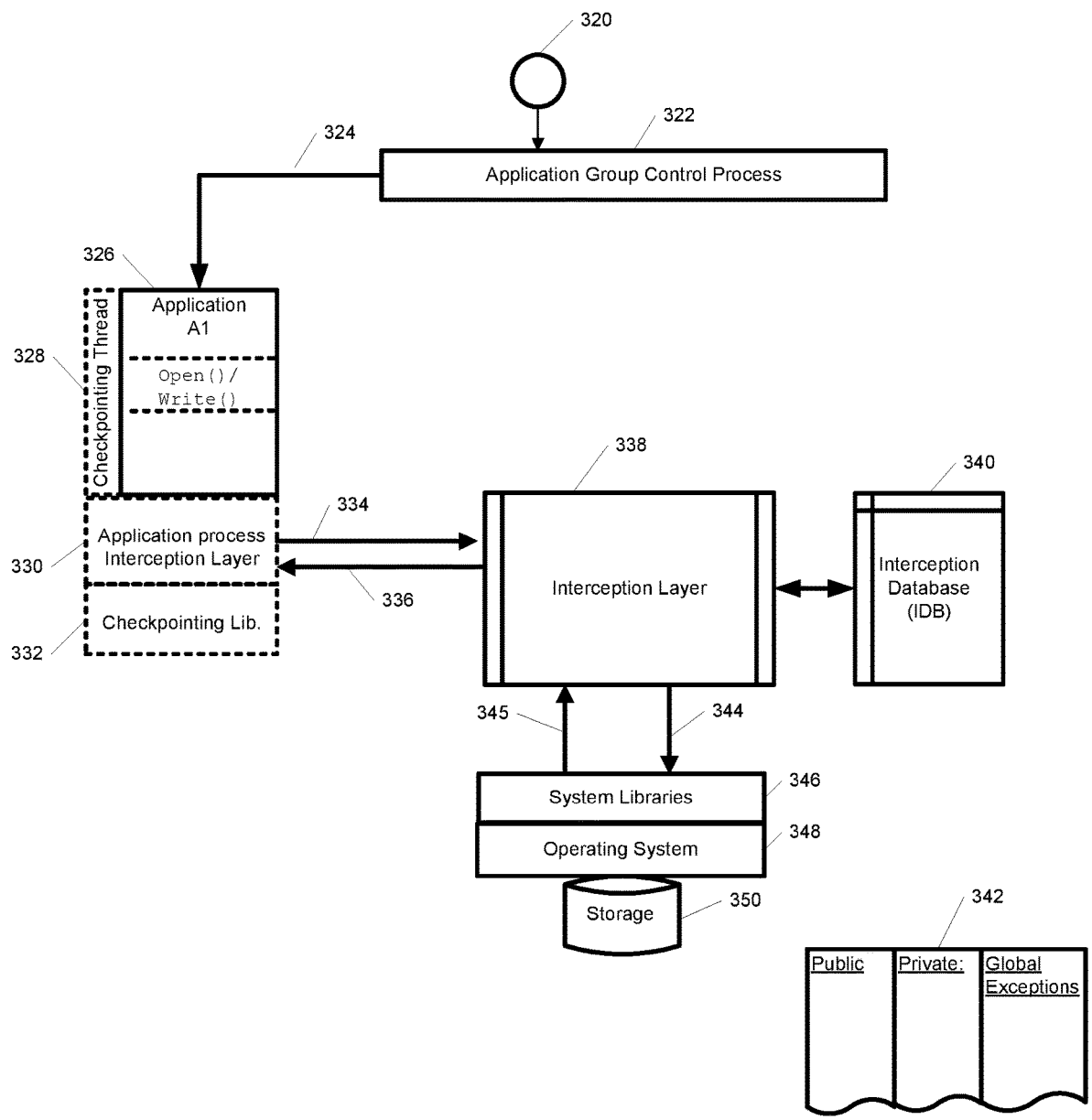
FIG.12 – Integration of checkpointer and isolated environment interception

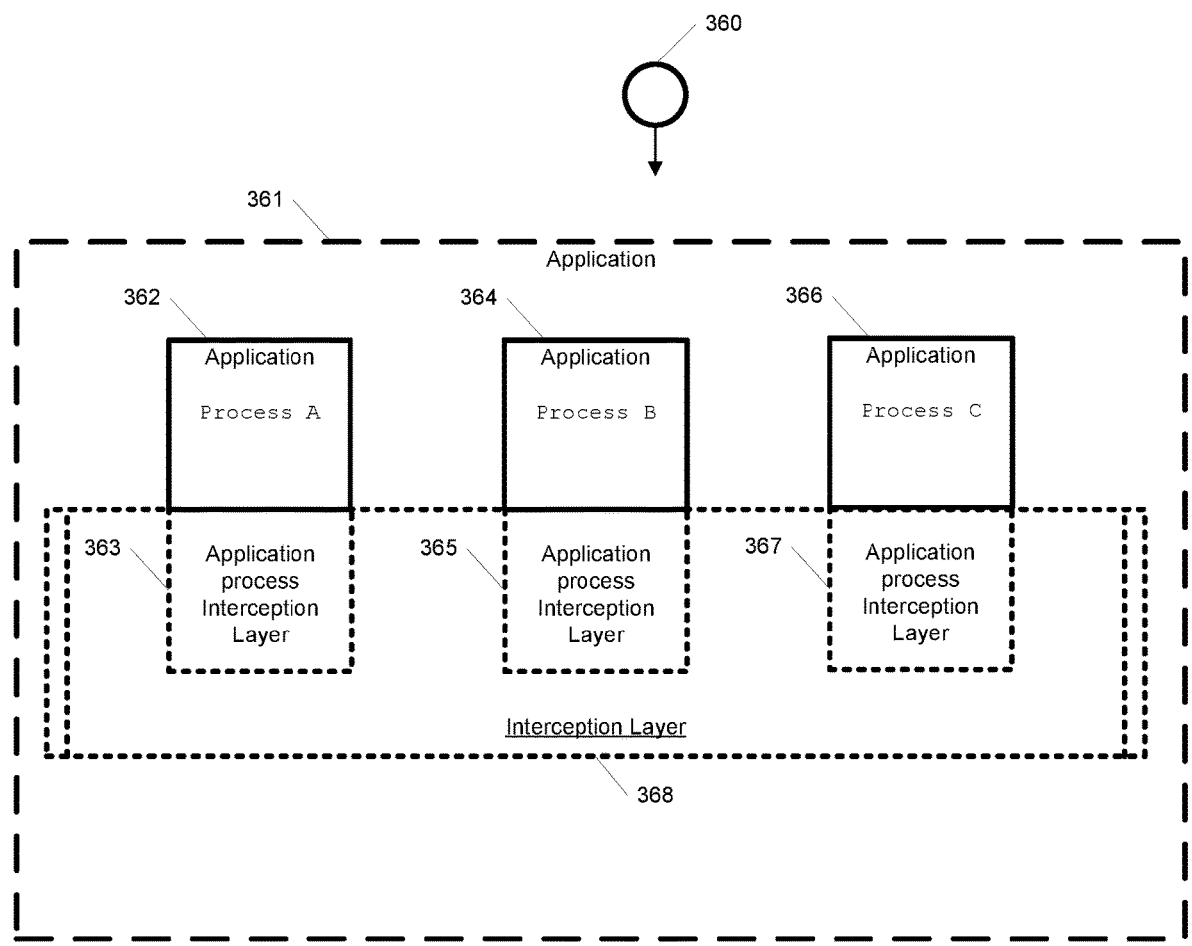
FIG.13 –Interception Layer implementation

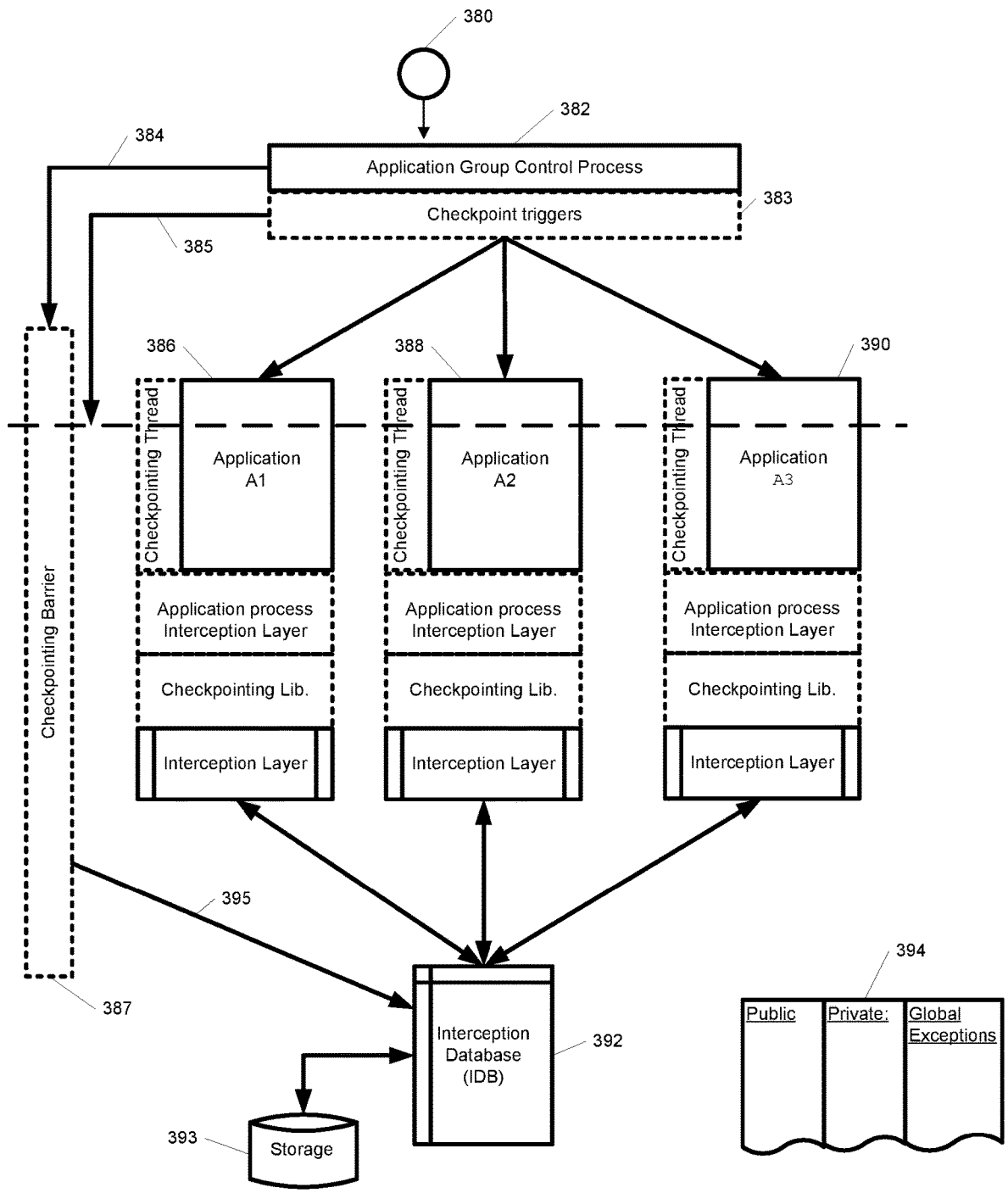
FIG.14 – Checkpointing and resstoring Application Groups

SYSTEM AND METHOD FOR HIERARCHICAL INTERCEPTION WITH ISOLATED ENVIRONMENTS

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND OF THE INVENTION

1. Field of the Invention

This invention pertains generally to enterprise computer systems, computer networks, embedded computer systems, wireless devices such as cell phones, computer systems, and more particularly to methods, systems and procedures (i.e., programming) for providing application isolation for multiple applications running on a host operating system and live migration of applications within and between isolated environments.

2. Description of Related Art

In many environments one of the most important features is to ensure that one running application doesn't affect other running applications, and that the crash of one application doesn't compromise other running applications. In many environments applications share system resources, libraries and hardware, which exposes subtle interconnects between seemingly unrelated applications.

Several approaches have been developed addressing this fundamental problem. The first level of application isolation is provided by the operating system. Modern operating systems such as Linux, UNIX, Windows2000, NT, XP and Vista provide some level of application isolation through the use of processes, and the underlying hardware memory management unit. The use of processes generally ensure than one running application process cannot address memory owned and used by other processes. This first level of isolation does not address the use of shared resources, such as files, file systems, shared memory, and libraries, so other approaches have been developed In U.S. Pat. No. 6,496,847 Bugnion et al. teach the use of a virtual machine monitor (VMM) with a protected host operating system (HOS). This invention partially solves the isolation problem by placing every application into its own VMM. The solution requires the use of a VMM subsystem and in some cases a customized operating system. U.S. Pat. No. 6,496,847 does not provide isolation at the level of individual applications, but for entire operating systems with all the applications within it. It does not address the problem of application isolation with multiple natively running applications on one host computer.

In U.S. Pat. No. 6,601,081 Provino et al. teach the use of a virtual machine for a plurality of application programs. As with U.S. Pat. No. 6,496,847 the use of a VM subsystem simply moves the problem to a different layer, and does not address the fundamental issue of application isolation with several natively running applications on one host computer.

In U.S. Pat. No. 7,028,305 Schaefer teaches a system for creating an application protection layer to separate an application from the host operating system. Shaefer primarily teaches how to intercept the Windows registry to capture configuration information for Windows application and how to create a virtual operating environment for the application. Access to files is provided via a virtual file system, access to registry information via the virtual registry etc. For Unix and MacOS few specific teachings are presented.

A related challenge to deployment of applications is that a running application generally cannot be moved without first shutting down the application and re-starting it on a new server. The terminate-restart cycle disconnects all users, terminates all sessions, and generally leaves the application services unavailable for some period of time. With the move to "Software as a Service (SaaS)", "Cloud Computing" or "Hosted Services" software services must be available at all times; anything else is considered unacceptable by customers. Today, service agreements for hosted services generally have penalties associated with any amount of downtime and application being unavailable.

In U.S. Pat. No. 7,213,246 Rietshote et al teach "Failing over a virtual machine" (VM) to a second system. Applications within the VM are failed over along with the entire VM. The failover requires a VM subsystem and does not address the issue of failing over the application without the presence of a virtual machine infrastructure.

In U.S. Ser. No. 11/567,983 Travostino et al teach "seamless live migration of virtual machines across optical networks". The live migration requires a virtual machine and does not address live migration of the individual applications within the virtual machine or between virtual machines.

In U.S. patent application Ser. Nos. 12/334,654, 12/334,655 and 12/334,657 Havemose et. al ("Havemose") teach checkpointing of application groups on Linux and the use of checkpointing for failover and live migration. In U.S. patent application Ser. Nos. 12/334,660, 12/334,663, 12/334,666 and 12/334,671Backensto et. al. ("Backensto") teach checkpointing of application groups on Windows operating systems and the use of checkpointing for failover and live migration. Both of Havemose and Backensto, included by reference above, teach application checkpointing and live migration that work transparently over the underlying operating system without the need of a virtual machine subsystem.

The present invention provides a system and methods to create an application isolation environment where applications can run unmodified, on un-modified operating systems without requiring any virtual environments, virtual machines or virtual machine monitors. The present invention also teaches how to manage and handle applications that share libraries and resources, and how to handle complex multi-process applications. In one embodiment an implementation in the Linux environment is disclosed, in another embodiment an implementation on Windows is disclosed.

Another aspect of the present invention is a system and methods to perform live migration of applications within and between isolated environments without requiring virtual machines, virtual machine monitors or other additional infrastructure.

BRIEF SUMMARY OF THE INVENTION

A method, system, apparatus and/or computer program are disclosed for achieving application isolation and application live migration for single and multi-process applications and their associated resources. The application isolation and application live migration is provided without requiring any changes to the host operating system kernel or requiring any changes to the applications. The application isolation and application live migration is fully transparent to both operating system and application and automatically adjusts for resources such as memory, storage, and CPUs being allocated and released. The application isolation is provided in an interception layer interposed between the individual applications and the operating system and an interception database. Additionally, the application live migration is provided in s shared library pre-loaded into each application during loading and initialization of the application. Preferably, any functional changes to system calls are done exclusively within the interception layer and interception database, and only in the context of the calling application.

Another aspect of the present invention relates to a computer readable medium comprising instructions for application and application group isolation and for application live migration The instructions are for installing the applications into the isolated environment, running the application in the isolated environment, un-installing applications from the isolated environment, configuring the isolated environments, live migrating applications within and between isolated environments, deploying the isolated environments and configuring the isolated environments and live migration

Definitions

The terms "Windows" and "Microsoft Windows" is utilized herein interchangeably to designate any and all versions of the Microsoft Windows operating systems. By example, and not limitation, this includes Windows XP, Windows Server 2003, Windows NT, Windows Vista, Windows Server 2008, Windows Mobile, and Windows Embedded.

The terms "Linux" and "UNIX" is utilized herein to designate any and all variants of Linux and UNIX. By example, and not limitation, this includes RedHat Linux, Suse Linux, Ubuntu Linux, HPUX (HP UNIX), and Solaris (Sun UNIX).

The term "node" and "host" are utilized herein interchangeably to designate one or more processors running a single instance of an operating system. A virtual machine, such as VMWare or XEN VM instance, is also considered a "node". Using VM technology, it is possible to have multiple nodes on one physical server.

The terms "application" is utilized to designate a grouping of one or more processes, where each process can consist of one or more threads. Operating systems generally launch an application by creating the application's initial process and letting that initial process run/execute. In the following teachings we often identify the application at launch time with that initial process.

The term "application group" is utilized to designate a grouping of one or more applications.

The terms "checkpointer", "checkpointing" and "checkpointing service" are utilized herein interchangeably to designate a set of services which 1) capture the entire state of an application and store all or some of the application state locally or remotely, and 2) restore the entire state of the application from said stored application state. The checkpointer may include the following components: dynamic link library ("checkpoint library"), loadable kernel module ("checkpointer kernel module"), a control process to monitor and coordinate an application group, and a merge utility to merge full and incremental checkpoints. The checkpointing services run on all nodes where the application groups run or are configured to run The terms "checkpoint", "taking a checkpoint", and "checkpoint file" are utilized herein interchangeably to describe the data captured by the checkpointing service. Generally, the checkpoint files are written to local disk, remote disk or memory. The terms "checkpoint restore" and "restore from checkpoint" are used interchangeably to describe the process of restoring an application from a checkpoint. The term "checkpoint-terminate" is used to describe the process of taking a checkpoint immediately followed termination of the application by the checkpointer before the application is allowed to run again.

The terms "live migration", "application live migration", and "migration" are utilized herein to describe the process of moving a running application from one isolated environment to another, including the isolated environment as necessary. Any clients connected to the running application are preferably unaware that the application is being moved, and are preferably unaffected by the application migration.

The term "fork( )" is used to designate the operating system mechanism used to create a new running process. On Linux, Solaris, and other UNIX variants, a family of fork( ) calls is provided. On Windows, one of the equivalent calls is "CreateProcess( )". Throughout the rest of this document we use the term "fork" to designate the functionality across all operating systems, not just on Linux/Unix. In general fork( ) makes a copy of the process making the fork( ) call. This means that the newly created process has a copy of the entire address space, including all variables, I/O etc of the parent process.

The term "exec( )" is used to designate the operating system mechanism used to overlay a new image on top of an already existing process. On Linux, Solaris, and other UNIX a family of exec( ) calls is provided. On Windows, the equivalent functionality is provided by e.g. "CreateProcess( )" via parameters. Throughout the rest of this document we use the term "exec" to designate the functionality across all operating systems, not just Linux/Unix. In general, exec( ) overwrites the entire address space of the process calling exec( ). A new process is not created and data, heap and stacks of the calling process are replaced by those of the new process. A few elements are preserved, including but not limited to process-ID, UID, open file descriptors and user-limits.

The term "Barrier" and "Barrier Synchronization" is used herein to designate a type of synchronization method. A Barrier for a group of processes and threads is a point in the execution where all threads and processes must stop at before being allowed to proceed. Barriers are typically implemented using semaphores, mutexes, Locks, Event Objects, or other equivalent system functionality. Barriers are well known in the art and will not be described further here.

In the following we use commonly known terms including but not limited to "process", "process ID (PID)", "thread", "thread ID (TID)", "thread local storage (TLS)", "instruction pointer", "stack", "kernel", "kernel module", "loadable kernel module", "heap", "stack", "files", "disk", "CPU", "CPU registers", "storage", "memory", "memory segments", "address space", "semaphore", "loader", "system loader", "system path", "sockets", "TCP/IP", "Inter-process communication (IPC), "Asynchronous Procedure Calls (APC)" and "signal". These terms are well known in the art and thus will not be described in detail herein.

The term "transport" is utilized to designate the connection, mechanism and/or protocols used for communicating across the distributed application. Examples of transport include TCP/IP, Message Passing Interface (MPI), Myrinet, Fibre Channel, ATM, shared memory, DMA, RDMA, system buses, and custom backplanes. In the following, the term "transport driver" is utilized to designate the implementation of the transport. By way of example, the transport driver for TCP/IP would be the local TCP/IP stack running on the host.

The term "interception" is used to designate the mechanism by which an application re-directs a system call or library call to a new implementation. On Linux and other UNIX variants interception is generally achieved by a combination of LD_PRELOAD, wrapper functions, identically named functions resolved earlier in the load process, and changes to the kernel sys_call_table. On Windows, interception can be achieved by modifying a process' Import Address Table and creating Trampoline functions, as documented by "Detours: Binary Interception of Win32 Functions" by Galen Hunt and Doug Brubacher, Microsoft Research July 1999". Throughout the rest of this document we use the term interception to designate the functionality across all operating systems.

The term "file context" or "context" is used in relation with file operations to designate all relevant file information. By way of example, and not limitation, this includes file name, directory, read/write/append/execute attributes, buffers and other relevant data as required by the operating system.

The term "transparent" is used herein to designate that no modification to the application is required. In other words, the present invention works directly on the application binary without needing any application customization, source code modifications, recompilation, re-linking, special installation, custom agents, or other extensions.

The terms "private and isolated environment" and "isolated environment" are used herein interchangeably to designate the private area set aside for application isolation, as described in further detail below.

The present invention provides application isolation at several levels: 1) during installation, all installation and registration information is intercepted and installation is re-directed to a private and isolated environment, 2) during launch of an application the installation information is retrieved and provided to the application again via interception, and 3) during access to external resources interception of all access is re-directed as necessary. The combination of all levels of isolation provides for fully transparent application isolation. Thus at all times, access to resources, configuration and run-time information is intercepted and redirected.

By way of example, and not limitation, for embodiments within Windows operating systems, access to the Windows Registry is intercepted and included in the application isolation.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

FIG. 1 is a block diagram of the core system architecture showing two applications, the interception layer, and the interception database.

FIG. 2 is a block diagram illustrating installation and running of applications.

FIG. 3 is a block diagram illustrating un-installation.

FIG. 4 is a block diagram illustrating the Interception Database.

FIG. 5 is a block diagram illustrating running application groups.

FIG. 6 is a block diagram illustrating running multiple application groups concurrently.

FIG. 7. is a block diagram illustrating installation-free deployment.

FIG. 8. is a block diagram illustrating administration.

FIG. 9 is a block diagram illustrating various deployment scenarios.

FIG. 10 is a block diagram illustrating interception data and control flow.

FIG. 11 is a block diagram illustrating checkpointing within an isolated environment.

FIG. 12 is a block diagram illustrating interception data and control flow with checkpointing activated.

FIG. 13 is a block diagram illustrating Interception Layer implementation.

FIG. 14 is a block diagram illustrating checkpointing and restoring of application groups within an isolated environment.

DETAILED DESCRIPTION OF THE INVENTION

Referring more specifically to the drawings, for illustrative purposes the present invention will be disclosed in relation to FIG. 1 through FIG. 14. It will be appreciated that the system and apparatus of the invention may vary as to configuration and as to details of the constituent components, and that the method may vary as to the specific steps and sequence, without departing from the basic concepts as disclosed herein.

0. INTRODUCTION

The context in which this invention is disclosed is one or more applications being installed, running and accessing local and remote resources. Without affecting the general case of multiple applications, the following scenarios often depict and describe one or two applications as applicable. Multiple applications are handled in a similar manner.

1. APPLICATION ISOLATION—OVERVIEW

FIG. 1 illustrates by way of example embodiment 10 the overall structure of the present invention. The following brief overview illustrates the high-level relationship between the various components; further details on the inner workings and interdependencies are provided in the following sections. FIG. 1. Illustrates by way of example embodiment 10 two applications A 22 and B 26 loaded in memory 14 on a node 12. The interception layers 16, 18, and checkpointing libraries CKPT lib. 17, 19 are interposed between the applications 22, 26 and the system libraries 20 and operating system 21. The interception database 28 provides system-wide persistent interception information and configuration information for the isolated environments. The interception layers 16,18 combined with the Interception database 28 provides application isolation 24. The checkpointer libraries 17,19 together with the interception layers 16,18 provide live migration. System resources, such as CPUs 36, I/O devices 34, Network interfaces 32 and storage 30 are accessed using the operating system. Devices accessing remote resources use some form of transport network 38. By way of example, system networking 32 may use TCP/IP over Ethernet transport, Storage 32 may use Fibre Channel or Ethernet transport, and I/O may use USB. The present invention access and arbitrate resources through the operating system and does not work at the transport level.

2. APPLICATION ISOLATION—INSTALLING AND RUNNING APPLICATIONS

FIG. 2 illustrates by way of example embodiment 40 installation of a typical application "AppXYZ" 42. The Interception Layer (IL) 50 intercepts all calls to system libraries and the operating system. IL 50 communicates with the Interception Database (IDB) 58 to create a private and isolated environment where the application can execute without depending on or affecting other parts of the environment. By way of example, and not limitation, first the installation process requests a resource 44, such as opening a file. The resource request is intercepted by IL 50 and a request to create 54 a private instance of the resource is made to the Interception Database (IDB) 58. The IDB 58 is a system wide database containing mappings 60, 62, 64 between the resources as the application 42 requests them 60, and their private values inside the isolated environment 62, subject to global exceptions 64. Further details on the IDB are given in section 4 below. By way of example, and not limitation, if the resource request 44 was to create a file in C:\Program Files\AppDir, the IDB may map that to a private location 62, such as D:\private\AppXYZ\C\Program Files\AppDir. So while AppXYZ 42 operates under the assumption that it's working on C:\Program Files\AppDir, in reality all access has been intercepted and re-directed to a private and isolated environment in D:\private\AppXYZ\C\Program Files\AppDir. The IDB 58 returns 54 the private resource to IL 50, which returns the resource handle 46 to the application 42. As the application 42 uses the resource 46 it operates under the assumption that the original resource request was satisfied, and is unaware that all resources have been relocated to a private and isolated environment. When use of the resource is terminated 48, the IL 50 sends a message to the IDB 58 that the resource currently is inactive 56. All mappings are maintained in the IDB 58 after the installation finishes as they may be needed after the initial request.

FIG. 2 also illustrates, by way of example embodiment 40, how an application 42 runs after being installed. As resources are opened, used, and freed, the same steps as disclosed above are used. As the application 42 executes, it generally access or create resources not used during installation. By way of example, if AppXYZ 42 is a word processor, the user may create a document and save it to storage. That document did not exist as part of the installation process, but is handled using the same mechanisms previously taught. As the user choose to create a new document, AppXYZ 42 makes a request 44 to have the file created. This is intercepted by the IL 50 and forwarded 52 to the IDB 58. The IDB creates a mapping between the Applications 42s public document name 60, and the private and isolated document name 62. As with Application 42 information stored in the IDB 58, so is the application data information stored persistently until un-installation.

In a preferred embodiment the interception layer is implemented in a shared library and preloaded as part of the load process.

At times it may be desirable to store some user-data outside the isolated environment, such as on a central file server. In a preferred embodiment, this is supported by specifying which resource locations should remain fixed and public in the global exceptions 64. Such public resources are not translated into the isolated environment.

3. APPLICATION ISOLATION—UNINSTALLING APPLICATIONS

FIG. 3 illustrates by way of example embodiment 80, un-installation of a typical application AppXYZ 82. The un-installation uses and requests resources 84, which are intercepted by the IL 86 and redirected 88 by the IDB 90, as disclosed above. All actions, such as deletion of files, are re-directed to the private and isolated location. When the un-install terminates, sometimes called exit( ), the exit is intercepted 92 by the IL 86, and forwarded 94 to the IDB 90. The IDB 90 removes all entries mapping 100 application AppXYZ 82 resources 96 against its isolated environment 98. The application is now uninstalled, and all isolation information has been removed.

4. APPLICATION ISOLATION—INTERCEPTION DATABASE AND RESOURCE MAPPING

The Interception Database (IDB) is a system wide database containing mappings between the resources as the application requests them, and their private values inside the isolated environment. FIG. 4 illustrates, by way of example embodiment 120, the Interception Database (IDB) 122, and its various components. The IBD 122 contains two main components, a rules engine 130 and the core resource mappings 132. The rules engine 130 contains the main high-level configuration information 124 as provided by an administrator 126. The rules engine 130 and its configuration information 124 includes, but is not limited to, information designating the base directory for installing the isolated environment, specific exceptions 138 to the resource mappings and the general mechanism used to create the mappings. The administrator 126 defines exceptions 138 as needed. The global exceptions contain all resources that should not be remapped to the isolated environments. Examples include, but are not limited to, shared storage, shared devices, network resources, and system-wide resources.

The resource mapping 132 maintains mapping between public resources 134 and the corresponding private and isolated resources 136. The resource mapping 132 also consults the global exceptions 138 prior to translating any public to private or private to public resource requests.

Resources take many forms including but not limited to files, fonts, shared libraries, shared devices, and storage. On Microsoft Windows the Registry is an important component and contains system wide configuration information used by most applications. Some resources, such as data files, tend to be local to the individual applications, while e.g. fonts tend to be shared between multiple applications.

Access to files is handled by the IL (FIGS. 2-50) intercepting all file operations between the application and the system libraries and operating systems. Examples include, but are not limited to open( ), fopen( ), write( ), read( ), close( ), seek( ), remove( ) and the Windows equivalents. Generally these functions either contain a public file name as part of the arguments, or a file handle to an already established file. The files names are remapped as disclosed above, to an isolated environment, and any further reference to the handle is automatically re-directed to the isolated environment. File operations that return information, are translate back to the public values. By way of example, and not limitation, if the applications ask for "current directory", the public name, as the application expects is returned, and not the private name within the isolated environment. By way of further example, if the current directory is located on shared storage included the global exceptions 138, the directory is returned un-translated, as it's subject to the exception handling.

File, paths and other resource names can be specified both as absolute values or relative values. By way of example, and not limitation, an absolute path for a document file may be "C:\MyDocuments\myfile.doc", while a relative reference may be "..\docs\myfile.doc". Absolute references are resolved as previously disclosed by consulting the public resources 134, private resources 136 and global exceptions 138. Relative addresses are resolved in a multi-step process: First relative names are converted to absolute names and then the absolute name is converted as previously disclosed. This mechanism ensures fully transparent support of both absolute and relative naming of all resources.

Fonts pose particular problems, as fonts reside both in application-specific directories and global system directories, such as "C:\Windows\Fonts" on Windows and "/usr/X11R6/lib/X11/fonts/" and "/usr/share/fonts/" on Linux. An application may install font both into one or more global font directories as well as application-specific directories. All shared-fonts directories are included in the Global Exceptions 138 as they should be accessed directly. If during installation additional fonts are installed, they are installed according to the policy chosen by the administrator 126. Prior to installation, the administrator chooses if application-installed fonts are allowed to be placed in the global fonts directory or if they should be placed in the isolated environment. The rules engine 130 consults this administrative choice and upon receiving a request to enumerate the font directory will include isolated-environment fonts if so configured. If the application installs its fonts into its own file structure, the fonts are treated as normal files and are not subject to the automatic enumeration as the application knows where to look for its application-specific fonts.

Modern operating systems share components across multiple applications. Such shared libraries also pose a special case. On Windows Dynamic Link Libraries (DLLs) and on Linux/UNIX shared objects (.so files) are examples of such shared components. On Window shared libraries primarily reside in C:\Windows and C:\Windows\System32, but can sit anywhere. On Linux/Unix the primary locations are '/usr/lib', '/usr/X11/lib' and the entire /usr/lib/directory structure. The loader of the operating system traverses the system PATH to find any requested shared library, but this can be manually or programmatically changed as part of the load process. The PATH is set using environment variables both on Windows and Linux. In order to intercept loading of shares libraries the present invention loads the application instead of using the system loader directly. This enables interception of library loading done by the loader. If during installation additional shared libraries are installed, they are installed according to the policy chosen by the administrator 126. Prior to installation, the administrator chooses if application-installed libraries are allowed to be placed in a global directory or if they should be placed in the private and isolated environment. If the libraries are placed into the private and isolated environment, the load PATH is adjusted to search the private location.

As with files, libraries can be loaded with both absolute and relative addresses. The load process handles the resource mapping as disclosed above. In all cases, the loading must follow the same path and address resolution as the system loader provides.

If the application installs its shared libraries into its own file structure, the libraries are treated as normal files and are not subject to an adjusted PATH or load-order as the application knows where to look for its application-specific libraries. In the preferred embodiment, if the application installs new shared libraries, they are installed into the isolated environment One of the most significant sources of application incompatibilities, and one of the motivators for the present invention, is shared library conflict. By way of example, and not limitation, if a shared library is loaded on the system, and a new application installs an older version of the library, the older version may overwrite the newer version and render other applications non-functional based on having their shared library replaced by an incompatible older version. This is a common problem on both the Windows and Linux platforms. Using the preferred embodiment disclosed above, the application would install the older library into its isolated environment and therefore not affect other applications. The application would load and use the older library without ever being aware that it was provided from the isolated environment, and other applications running on the system would be unaffected by the installation of the older library.

Microsoft Windows uses a special configuration system generally referred to as "the Registry". The registry contains configuration, installation and un-installation information for applications on the system. When an application installs on a Windows system, it uses the registry to store values such as "home directory", "recent files", etc. The preferred embodiment on Windows systems additionally include interception of all registry information, and ensures that installation and runtime information that would normally go into the registry, in stead is stored and maintained in the IDB. During installation of a Windows application all registry information is thus stored in the IDB and not the registry. When an application requests registry information, the information is provided from the IDB, and not the registry. This ensures complete application isolation from the registry.

The isolated environment contains all application files and shared resources and their respective mappings. These are all preserved persistently on local or remote storage and can be archived, copied and restored as any other set of files. Specifically, the isolated environment directory structure can be copied to a different node, and used directly to start the application on that node.

So far the Interception database has been described as a "database". Based on the teachings above, it's readily apparent to anyone skilled in the art, that the only requirement is that updates to the resource tables 134, 136 and 138 be atomic at the record level. This functionality can be readily implemented in a variety of ways, including using Java's ConcurrentHashMap( ), the Windows .NET equivalents, or by custom programming the data structures and locking. Furthermore, preferably concurrent access to the Interception Database translations is provided. In an alternate implementation such a custom interception database is used in stead of a full database.

5. APPLICATION ISOLATION—INTERCEPTION DATA AND CONTROL FLOW

FIG. 10 illustrates by way of example embodiment 240 the data and control flow in more detail. By way of example, and not limitation, consider first an environment with the present invention inactive. An application 242 calls a write( ) 243 operation. The write operation is resolved by the operating system loader and directed 244 to the system libraries 248 and operating system 250, and ultimately writes data to storage 251. Return value is returned 246 to the caller 243 within the calling application 242.

By way of example, and not limitation, consider an environment with the present invention active. An application 252 calls a write( ) 253 operation. As disclosed in above, the write( ) is intercepted 254 by the interception layer 262. Parameters to the write( ) call are translated by the Interception Database 264 and the rules for the isolated environment 266 and the file context and parameters of the calling write are adjusted to point to the isolated environment. The write call is then forwarded 268 to the system libraries 258 and operating system 260 as were the case with the present invention inactive. The return value 266 from the write is returned to the IL 262 which, using the IDB 264, maps the result back into the original context and returns the value 256 to the caller 253. The application 252 issuing the write 253 operating is thus unaware that the write is being intercepted and re-directed to the isolated environment. All translation and isolation is performed outside the application 252, and before the write operation ever reaches the system libraries 258 or operating system 260.

A specific example, using ANSI C, further illustrates the IL 262 and IDB 264 translations. Consider an example where a file is opened for writing, a small text is written, and the file is closed using the following code

```
int main(void)
{
    char const *pStr="small text";
    FILE *fp=fopen("/home/user/newfile.txt", "w")
    if (fp !=null)
        fwrite(pStr,strlen(pStr),1,fp);
    fclose(fp)
}
```

The call to fopen( ) returns a file pointer, which the fwrite( ) operation uses to write data to the file. The call to fopen( ) includes the file name "/home/user/newfile.txt" as the first parameter. The Interception Layer 262 intercepts the call to fopen( ) and changes the actual filename to the corresponding location in the isolated environment before passing 268 the call on to the system library implementation 258. The following fwrite( ) operation is unaware that the file pointer points to the isolated environment and simply writes the data. Finally, fclose( ) is called to close the file. The file pointer still points to the isolated environment and the close proceeds as a close would without the present invention active.

6. IMPLEMENTATION CONSIDERATIONS FOR THE INTERCEPTION LAYER

In a preferred implementation the interception layer is implemented as a shared library and pre-loaded into each application process' address space as part of loading the application. Shared libraries are implemented in such as way that each instance of the interception layer share the same code, but have their own private data, where said private data corresponds to the interception and resource translations undertaken on behalf of the particular application process and its threads. In a multi-process application the interception layer is therefore comprised of one interception layer per application process, and together the process-level interception layers comprise the interception layer. On most diagrams within these disclosures we therefore show one interception layer corresponding to the fact that only one shared library has been loaded, and where necessary point out that each process is being intercepted separately. The application process interception layers are generally referred to as "application process interception layer" on the diagrams.

A related issue with interception is that intercepted functions may call other intercepted functions. As long as said calls are performed using public intercepted names, the previous teachings fully describe the interception. At times shared library developers take shortcuts and don't use the public names, but refer directly to the implementation using a private name. In such cases, the interceptor must overlay a copy of the intercepted shared library code using fully resolved public function names.

FIG. 13 illustrates by way of example embodiment 360, an application 361 with three application processes: process A 362 with its preloaded application process interception layer 363, process B 364 with its preloaded application process interception layer 365, and process C 366 with its preloaded application process interception layer 367. The Interception Layer 368 for all the application processes is comprised of the three individual application process interception layers 363, 365, and 367.

In an alternate implementation, a separate application interception layer process is created, and the individual application process interception layers communicate with the application interception layer using sockets, TCP/IP, pipes or other inter-process communication (IPC). This is generally less attractive, as it requires the creation of a separate process and additional communication overhead.

7. APPLICATION ISOLATION WITH APPLICATION GROUPS

At times multiple applications share data, libraries and work in combination. By way of example, and not limitation, a Microsoft Word document may include or require a Microsoft Excel spreadsheet. In general any number of applications may need to collaborate and share data. So far the approach has been to isolate applications so that, to continue the example, if Word and Excel were installed separately, they would both be isolated and not able to work together. To enable sharing between pre-designated applications, the applications need to be grouped together in an application group and installed inside the same isolated environment. FIG. 5 illustrates by way of example embodiment 140, an application group 141 with three individual applications operating within the present invention. Any other number of applications is handled in a similar manner. The administrator 152 pre-defines the application group 141 and the individual applications within the group: App-1 142, App-2 144 and App-3 146. During launch interception layers are preloaded into each application as previously disclosed: App-1 142 has its interception layer 143 preloaded, App-2 144 has its interception layer 145 preloaded, and App-3 has its interception layer 145 loaded. Similar to how individual processes within an application are handled, the three individual interception layers 143, 145, 147 comprise the application group's interception layer 148.

As taught, the interception layer for an application and the interception layer for an application group work in a similar manner using the same preloaded shared library; hence there is no need to distinguish between the two. In the following, the nomenclature "Interception Layer" is used to designate the interception functionality across both applications and application groups.

The administrator 152 commits the application group to the IDB 150. The IDB uses the same mechanisms as disclosed above for individual applications, and structures the isolated environment 154 so that the individual applications share resources and file system. By installing the applications together they automatically use the same isolated environment and sharing is fully automatic without requiring any additional information. The interception layer 148 intercepts, as previously disclosed, and requires no special configuration; all application group information is contained within the IDB 150 and the settings for the isolated environment 154.

8. CONCURRENT OPERATION OF MULTIPLE APPLICATION GROUPS

FIG. 6 illustrates by way of example embodiment 160, concurrent operation of three application groups: application group A 162, application group B 166 and application group C 170. Each application group consists of one or more applications. As previously disclosed each application group has a dedicated interception layer: IL 164 for application group A 162, IL 168 for application group B 166, and IL 172 for application group C 170. Each interception layer 164, 168, 172 provide the interception services as previously disclosed, with each attached to only one application group. As previously disclosed, the Interception Database 174 is global, and is shared between all application groups and interception layers.

The administrator 176 commits all administrative settings to the IDB 174, which is reflected in the database tables for the isolated environment 178.

9. RUNNING MULTIPLE CONCURRENT INSTANCES OF ONE APPLICATION

At times it may be desirable to run multiple instances of the same application or application group, but in separate isolated environments. Referring again to FIG. 6 for illustrative purposes. The administrator 176 defines each instance of the application group using separate application group names. Even though Application Group A 162, Application Group B 166, and Application Group C 170 are identical, they have been pre-defined with their own environment, and thus run in separate isolated environments without any further intervention or configuration.

10. ADDING CHECKPOINTING TO THE ISOLATED ENVIRONMENT

The Backensto and Havemose references cited above teach checkpointing of multi-process multi-threaded application groups on Windows and Linux respectively without an isolated environment. The general approach taken include:

- A public Barrier, generally implemented as a named semaphore
- Full transparency requiring no changes to application or operating system,
- Pre-loading of a checkpointing library into the address space of the individual processes,
- Interception of key system functions, such as exec, fork, and access to system resources such as files,
- Per-process dedicated checkpointing thread, and
- Programmatic launch of all application group applications and processes through a coordinated Application Group Control Process (AGCP), called a "coordinator" in the two cited applications.

Checkpointing of application groups within the isolated environment is complicated by the addition of two new functional components: the interception layer (including the application process interception layers), and the interception database. Generally, the interception layer is contained within the application processes, while the interception database is external. The following teachings incorporate the cited checkpointing references into the present invention.

Application isolation utilizes interception to redirect resource access to the isolated environment. To provide checkpointing in the context of application isolation, the previously disclosed interception mechanism is enhanced to first pass all intercepted functions through the checkpointing library. The checkpointing library operates on the running program on the host operating system, and utilizes interception to capture fork( ) exec( ) memory operations and other resources as disclosed in the two cited references. This is followed by the interception handling for resource mapping related to the isolated environment as disclosed previously.

The checkpointing library is pre-loaded along with the interception layer into the address space of each application process. To keep multiple independent processes coordinated a new component is introduced: the Application Group Control Process (AGCP) responsible for launching the application group, preloading the libraries, initializing and starting the application group. In summary the following additional steps and components are added:

- The Application Group Control Process (AGCP) with responsibility for launching all applications within the application group, preloading all interception and checkpointing libraries
- Processing of fork( )/exec( ) and resource interceptors and communication of process creation and resource allocations to AGCP
- Automatic and transparent addition of a checkpointing thread to all running processes within all application groups being checkpointed.
- Creation of a public checkpoint barrier by AGCP
- Asynchronous triggering of checkpoints by AGCP The AGCP furthermore assumes the full functionality of the loader and the custom symbol resolution as disclosed above. AGCP is responsible for all aspects of application launch, termination, installation of interception, loading of checkpointing library, and triggering of checkpointing.

In an embodiment on Linux and UNIX, AGCP triggers the asynchronous checkpoints using signals. In an embodiment on Window, Asynchronous Procedure Calls (APC) are used to trigger the checkpoints.

FIG. 11 illustrates by way of example embodiment 280 checkpointing of an application group 282. By way of example, the application group 282 consists of one application A1 286. Multiple applications are handled in a similar manner. The Application Group Control Process (AGCP) 284 launches 285 Application A1 286. The AGCP 284 loads 304 the barrier 302 for the application group. As part of the load process, the AGCP 284 preloads the interceptors 288, including the Interception Layer (IL) 300, for each application process and the checkpointer library 289 for each application process. The application process interception layer 288 and the checkpointing library 289 are shared libraries and pre-loaded together. In an alternate implementation, the application process interception layer 288 and the checkpointing library 289 are combined into one shared library. Both libraries operate within the address space of the application process where they were loaded. FIG. 11 illustrates by way of example an Application A1 286 with one process and one corresponding application interception layer 288 and one checkpointing library 289. Multiple processes are handled in a similar manner with each process having a corresponding application process interception layer and checkpointing library. As previously taught, the Interception Layer for an application is comprised of the individual application process interception layers. To distinguish between interception inside the application process interception layer 288 and the resource re-mapping functionality managed by the interception layer, the Interception Layer 300 is depicted on the diagrams. In the preferred implementation, the resource remapping functionality within IL 300 is embedded within the application process interception layer 288 and is executed after the checkpointing interceptors return 297 to the application process interception layer 288.

As part of loading and initializing the application A1, AGCP 284 further creates a dedicated checkpointing thread for each process in the application group. FIG. 11 illustrates by way of example a one-process application A1 with one corresponding checkpointing thread 312. Multi-process applications are handled in a similar manner with one checkpointing thread created per process. As processes are created and terminated, checkpointing threads are added and removed as necessary as disclosed in the two cited references. As part of initializing the checkpointing library 289, the checkpointing library registers 306 the current process with the checkpoint barrier 302 The registration ensures that the current thread and process is included in the barrier, and ensures that the current process' checkpoint thread 312 is called as part of the barrier The Interception database IDB 301 is global to all application groups within the isolated environment. If the IDB 301 has not been loaded, the AGCP 284 launches the IDB 301 prior to the performing the load process disclosed above.

The checkpointer and the isolated environment both need access to all intercepted functions. In general, the checkpointer operates on the running application and utilizes interception to capture resource and their usage. The isolated environment utilizes the interception to re-direct resource usage to the isolated environment. By way of example, and not limitation, when application A1 286 reaches function ifunc( ) 293, which is subject the interception, the previously disclosed control flow is adjusted to account for the presence and requirements of the checkpointer. The function ifunc( ) 293 is intercepted 294 and re-directed to the application process interception library 288. At this point ifunc( ) its context and parameters reflect the actual running application process. The intercepted call is first forwarded 296 to the checkpointing library 289, where all relevant stack information is saved, as disclosed in the two cited references. If ifunc( ) changes the process hierarchy, the change is communicated 302 to AGCP 284 in order to have AGCP 284 preload or remove the interceptors as previously disclosed. Control is then returned 297 to the application process interception layer 288. The application process interception layer calls 290 to the Interception Layer (IL) 300. The IL 300 remaps resources using the Interception Database 301 as previously disclosed. Adjusted resources or data are returned 292 to the interceptor and sent back 295 to the calling application process via the return of ifunc( ).

11. INTERCEPTION, CHECKPOINTING, DATA AND CONTROL FLOW

In continuation of the example in section 5 above, FIG. 12 illustrates by way of example embodiment 320 the data and control flow with checkpointing activated. By way of example the application group consists of one application 326 with one process. The Application Group Control Process 322 as previously disclosed, launches the application 326, preloads the application process interception layer 330, preloads the Interception Layer 338, the checkpointing library 332, and creates the checkpointing thread 328. As disclosed the AGCP 322 also launches the Interception database 340 as necessary.

Continuing the example from section 5:
int main(void)
{
char const *pStr="small text";
FILE *fp=fopen("/home/user/newfile.txt", "w")
if (fp !=null)
fwrite(pStr,strlen(pStr),1,fp);
fclose(fp)
}

The call to fopen( ) is intercepted by the application interception layer 330, and passed to the checkpointing library 332. The checkpoint library 332 captures the real resource name ("/home/user/newfile.txt") and attributes ("w"), as disclosed in the two cited references, and the call returns to the application process interception layer 330 and forwarded to the Interception Layer 338. The interception layer 338 then, as previously disclosed, translates using the IDB 340, the public resource into the corresponding resource in the isolated environment 342. The call to fopen( ) is finally forwarded 344 to the actual implementation in the system libraries 346 and operating system 348. Return values 345 from fopen( ) is returned to the IL 338, translated 340 back into the host environment as appropriate, forwarded 336 to the application process interception layer 330, and ultimately returned to the calling application process 326. The file pointer (FILE *fp) has been created in the host environment by the application 326, intercepted for checkpointing with host-environment settings, and re-directed to the isolated environment by the IL 338 and IDB 340. This ensures that the checkpointer works on the actual executing program, while resource access is redirected under both the application 326 and the checkpointer 332.

The call to fopen( ) is followed by a call to fwrite( ) writing data to disk. Contrary to fopen( ) fwrite( ) operates on a file pointer, and appears host-native to the application and the checkpointer, but was translated by the isolated environment as just disclosed. The checkpointer intercepts the fopen( ) call, but does not need to do modify anything. Likewise, the interception for the isolated environment does not need to modify any of the parameters and lets the fwrite( ) simply write the data.

By way of example, and not limitation, the teachings so far describe two-layer interception: first interception by the application process interception layer followed by interception by the checkpointer. In general, any number of interceptions can be layered in a similar manner. Similarly, a hierarchy of interception is supported by traversing the hierarchy and each time passing arguments and results down and up the hierarchy, as disclosed for the two-layer interception. Most applications use multiple system libraries or other shared libraries all of which are loaded as part of the load process. As previously disclosed, the Application Group Control Process (AGCP) is responsible for loading the application group. The AGCP includes the operating system loader logic, and therefore has access to and knowledge of references to external libraries and is responsible for loading them. The AGCP automatically intercepts all functions in said libraries, building the interception hierarchy automatically without requiring any manual intervention.

12. CHECKPOINTING AN APPLICATION OR APPLICATION GROUP WITHIN THE ISOLATED ENVIRONMENT

FIG. 14 illustrates by way of example embodiment 380 checkpointing of application groups within an isolated environment. By way of example the application group consists of three applications: application A1 386, application A2 388 and Application A3 390. Any number of applications is handled in a similar manner. Each application may be single process or multi-process. As previously taught in detail, the application group control process (AGCP) 382 loads 384 the barrier 387, the individual applications A1 386, A2 388 and A3 390. The AGCP also pre-loads the application process interception layer, checkpointing library, Interception layer for each application process, and creates the checkpointing thread for each application process. Finally the AGCP 382 loads the Interception database 392 if not already loaded. For each application process, the process, checkpointing thread and the pre-loaded libraries run within the address space of the process.

Checkpoints are taken in a synchronized manner across all application processes. The synchronization is accomplished using the checkpointing barrier 387. The detailed teachings of checkpointing multi process application groups are provided in the Havemose and Backensto references previously cited. The general checkpointing process is
- Triggering of checkpointing 383 by AGCP 382 and activation of the barrier 387
- Signaling 385 of each individual checkpointing thread to enter the barrier and halt its process and threads at the barrier
- Checkpointing of all application processes and threads followed by checkpoints being written to local or remote disk
- Upon completion, all application processes are released from the barrier.

The checkpoint includes all data within the address space of the application processes, including the application process interception layer, the interception layer and the checkpointing library. This ensures that any in-process interception or resource mapping is fully captured and included in the checkpoint.

By way of example, and not limitation: A1 has intercepted an open( ) call, processed it in the application process interception layer and the checkpointing layer, and is in the middle of processing the resource mapping in the interception layer at the time the barrier is entered. With the entire address space included in the checkpoint, the exact state of all shared library data is captured, including the incomplete resource mappings. If at a later time a restore from checkpoint is issued, everything is brought back in the same state, including the incomplete resource mapping.

In a preferred embodiment, the application checkpoints are stored within the isolated environment. In an alternate embodiment, the application checkpoints are stored outside the environment in a shared location.

In a preferred embodiment, the Interception database 392 is not included in the checkpoints for the individual applications, but is runs as a separate entity. As part of the checkpointing barrier 387 a signal 395 is sent from the barrier to the interception database 392 to persistently store 393 the settings for the application group's isolated environment.

In an alternate implementation where only one application group uses the interception database 392, the interception database is added to the application group, launched by the AGCP 382 and included in the barrier 387 and the checkpoints

13. RESTORING APPLICATION GROUPS FROM CHECKPOINTS

The teachings for restoring multi-process, multi-threaded application groups running without an isolated environment are disclosed in the Havemose and Backensto references cited above and included by reference.

The checkpoints for the application group contain all the process and thread hierarchy information, including all environmental information. FIG. 14 also illustrates an example embodiment 380 of the key steps involved in restoring an application group from checkpoints. First the Application Group Control Process (AGCP) 382 is loaded. The AGCP 382 reads the process tables from the checkpoints and creates the process and thread hierarchy for the entire application group. For application A1 386 the checkpoint is loaded from disk, the process hierarchy is overlaid with the checkpoint image, and the image is exec( )'ed the number of times indicated in the checkpoint and environment. The AGCP 382 also pre-loads all necessary shared libraries, including but not limited to the application process interception layer, the interception layer, and the checkpointing library. The AGCP 382 repeats this for application A2 388 and application A3 390.

All processes and threads within the application A1 386, A2 388 and A3 390 are halted at the barrier 387, corresponding to checkpoint from which they are being restored. All threads and processes are then released from the barrier and the application group proceeds to run.

As the interception layer and the application process interception layer are included in the checkpoint, any in-process resource translation resumes at the exact point where the checkpointing occurred. This ensures consistency across checkpoint and restore.

In a preferred embodiment, the application checkpoints are stored within the isolated environment. When restoring, the checkpoint is available within the isolated environment.

In an alternate embodiment, the application checkpoints are stored outside the environment in a shared storage, typically on networked storage. When restoring, the checkpoint file is first retrieved from the shared storage then used to restore from.

In a preferred embodiment where the interception database 392 is external to the application group, the interception database 392 is reloaded with the settings for the isolated environment 393 while the application group is in the barrier. The settings for the isolated environment were persistently stored 393 as part of the checkpointing barrier.

In an alternate embodiment where the interception database is included in the application group, the interception database is restored along with the application group.

14. CHECKPOINT AND LIVE MIGRATION TRIGGERS

Checkpointing and Live Migration can be triggered in a variety of ways. In general, the trigger can fire at any time and is, from the application group's perspective, therefore asynchronous.

FIG. 14 illustrates by way of example embodiment 380, the checkpoint and live migration trigger module 383 within the application group control process 382. While the trigger may be deterministic as far as the checkpoint triggers 383 is concerned, it arrives 385 asynchronously and asynchronously triggers entry into the barrier 387.

Example triggers include but at not limited to:
Time based trigger, such as ever 5 seconds or once daily
Environmentally based triggers such as
   CPU load being too high for some period of time
   CPU temperature being too high for some period of time
   Host running out of disk space
   Host running out of memory
Configuration based trigger
   User's application quota exceeded on system
   Application need resources not available on current host
User-driven triggers such as
   administrator issues a live migrate in preparation for a host reboot
   administrator issues a live migrate in preparation for an application upgrade While the actual trigger may vary, the underlying event mechanism is the same: The AGCP's 382 checkpoint trigger module 383 issues a checkpointing event 385 to the barrier 387.

15. INSTALLATION-FREE DEPLOYMENT

One of the major problems with application deployment is the actual installation and the associated risks as disclosed previously. Using the present invention, a pre-created isolated environment can be used in place of performing an actual installation. The isolated environment contains all application files, shared libraries, and installation data and can be moved, copied and run from anywhere the present invention is present.

FIG. 7 illustrates by way of example embodiment 180, how to deploy an isolated environment without needing more than one initial installation 181. First the administrator 196 installs 184 the application group 182. As previously taught the interception database 186 creates an isolated environment 188 which contains all application group data, including shared files, data and programs. As taught above, the isolated environment is written to storage and can be copied and run elsewhere. With the isolated environment ensuring isolation from the underlying operating system and applications, an isolated environment can be deployed on a different node by copying the entire isolated environment directory structure to the new node and starting the application. Referring to FIG. 7, the administrator 196 copies the isolated environment 188 into the first node 190, the second node 192 and the third node 194.

In an alternate embodiment, the environment 188 is stored on shared storage, and is accessed directly from the shared storage. In this embodiment, the isolated environment is loaded directly from shared storage, and only local data, such as temporary files, are kept locally.

In another embodiment, the environment 188 is saved to storage and shipped to a remote site. The remote site loads the environment and runs the applications directly from within the environment without any installations. In this embodiment the present invention may be used for disaster recovery.

16. LIVE MIGRATION OF APPLICATION GROUPS WITHIN AND BETWEEN ISOLATED ENVIRONMENTS

Installation free deployment can be enhanced using the checkpointer to provide "live migration" of running application groups. A "Live Migration" is the process of moving a running application from one environment to another without restarting the application and losing session data. The isolated environment and checkpointing are configured such that the checkpoints are included within the isolated environment. A live migration of an application group is performed with the following steps:

*Checkpointing of the application group including saving the checkpoint within the isolated environment. The applications within the group are terminated just prior to exiting the checkpointing barrier ("checkpoint-terminate").
   *Copy the isolated environment data to the destination system
   *Restore the application group from the checkpoints supplied within the isolated environment.
   The restore from checkpoint can be activated within the same isolated environment, within a new isolated environment on the same host, or on a new isolated environment on a different host.

The net effect of checkpoint-terminate followed by a restore from checkpoint, is that the application execution is moved from one isolated environment to another without loss of data. There is no loss of application data, as the application is precluded from running between the checkpoint and the restore, and therefore has not executed any instructions.

17. LIVE MIGRATION FOR SCALE-OUT

In a preferred embodiment, Live Migration may also be used for scale-out. In stead of terminating a just check pointed application group, said application group is left running while a second copy is created using the checkpoint on a new host. After creating the second application group using the modified live migrate, there are two running copies of the same application with identical configuration. Using a front-end load-balancer, incoming traffic is divided between the two application groups with each copy handling approximately half of all sessions. Inactive sessions generally automatically expire.

18. ADMINISTRATION

FIG. 8 illustrates by way of example embodiment 200, the management infrastructure. The administrator 202 communicates configuration preferences to the Interception database 204 for each isolated environment 206. The IDB 204 contains, as disclosed above, two separate modules: 1) a rules engine (FIGS. 4—130) and 2) management of the resource mappings (FIG. 4—132). The rules engine implements the administrator provided resource translations and populates the tables (FIG. 4—134,136,138).

The administrator 202 provides general configuration information applicable to all isolated environments and applications 203, unless explicitly changed for a particular isolated environment 205. Examples of administrator-provided global configuration information 203 includes, but is not limited to
- Default storage location for all isolated environments
- Default resource exceptions
- Default application and application group naming
- Default policy for installing fonts and shared resources into global or isolated environment
- Default checkpointing policies including checkpointing frequency, and location of checkpoint storage
- Default live migrate policies such as thresholds for CPU utilization, CPU heat, and storage utilization Each setting can be changed, i.e. replaced, on an application by application basis, and on an application-group by application basis. As determined by the administrator, examples of administrator-provided application-level configuration information 205 include, but is not limited to
- Storage location for isolated environment
- Logical name of application or application group
- Application or application-group specific resource exceptions
- Policy for installing fonts and shared resources into global or isolated environment
- Checkpointing and live migrate policies The combination of the global configuration information 203 with the rules engine (FIG. 4—130), makes the configuration and deployment on new isolated environment fully automatic after the initial global configuration has been provided. As disclosed, it may be desirable to change one or more of an application's isolated environment settings. By way of example, and not limitation, if a particular application needs to locally access certain resources only available on a particular server, that one application's isolated environment would be located on that particular server, while all other environments were centrally stored. The ability to "mix and match" environments and deployments ensure full flexibility and ability to deploy multiple applications in a heterogeneous environment with all the benefits of the present invention.

In another embodiment the administrative functions 202 is done programmatically using an Application Programming Interface (API).

11. DEPLOYMENT SCENARIOS

FIG. 9 illustrates by way of example embodiment 220 a variety of ways the invention can be configured to operate. In one embodiment, the invention is configured to run from a central file server 222, in another it is configured to run on a pair of application servers 224, 226. In a third embodiment the invention is configured to run on a LAN 228 connected PC 232 together with the application servers 224, 226, and with environments loaded from the central file server 222. In a fourth embodiment the invention is configured to isolate applications on a cell phone 230, which is wirelessly connected 238 to the Internet 236, the application servers 224,226 and the file server 222. A fifth embodiment has an isolated environment on a home-PC 234 connected via the internet 236 to the application servers 224,226 and the LAN PC 232. The invention runs on one or more of the devices, can be distributed across two or more of these elements, and allows for running the invention on any number of the devices (222,224,226,230,232,234) at the same time

12. CONCLUSION

In the embodiments described herein, an example programming environment was disclosed for which an embodiment of programming according to the invention was taught. It should be appreciated that the present invention can be implemented by one of ordinary skill in the art using different program organizations and structures, different data structures, and of course any desired naming conventions without departing from the teachings herein. In addition, the invention can be ported, or otherwise configured for, use across a wide-range of operating system environments.

Although the description above contains many details, these should not be construed as limiting the scope of the invention but as merely providing illustrations of some of the exemplary embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A system, comprising:
   a primary host computer comprising:
      a computer system memory configured to store one or more primary applications, and
      one or more Central Processing Units operatively connected to the computer system memory and configured to execute the one or more primary applications in one or more corresponding isolated environments;
   one or more backup hosts each comprising:
      a computer system memory configured to store one or more backup applications, and
      one or more Central Processing Units operatively connected to the computer system memory of the one or more backup hosts and configured to execute the one or more backup applications; and
   a synchronization point configured to trigger, via one or more events, a migration of the one or more primary applications and the one or more corresponding isolated environments from the primary host to the one or more backup applications on the one or more backup hosts.

2. The system according to claim 1, further comprising:
a host operating system for the primary host and the one or more backup hosts, wherein the host operating system is one of Linux, UNIX or Microsoft Windows.

3. The system according to claim 1, wherein the one or more events trigger a migration over a network transport.

4. The system according to claim 3, wherein the network transport is using one or more of a network protocol, Message Passing Interface (MPI), Myrinet, Fibre Channel, Ethernet, ATM, Shared memory, Direct Memory Access (DMA), Remote Direct Memory Access (RDMA), USB, system busses, and custom backplanes.

5. The system according to claim 1, wherein the one or more events are one of operator generated migration event, Central Processing Unit threshold event, memory threshold event, storage threshold event, network event, or script-generated event.

6. The system according to claim 1, wherein the one or more events trigger transmission of checkpointing information from the one or more primary applications to the one or more backup applications.

7. The system according to claim 1, further comprising, registering the one or more primary applications with the synchronization point.

8. The system according to claim 1, wherein the system is configured to choose a backup host based on one of a preconfigured backup, an operator-chosen backup, or a backup chosen based on available resources.

9. The system according to claim 1, wherein the one or more events are generated external to the one or more primary applications.

10. The system according to claim 1, wherein the one or more events configured to trigger a migration of the one or more primary applications are configured to designate a particular backup application of the one or more backup applications to take over execution, and
wherein the synchronization point for the one or more primary applications is configured to exit the one or more primary applications after a migration to the designated backup application.

11. The system according to claim 10, wherein the one or more events configured to trigger a migration of the one or more primary applications are further configured to:
migrate the one or more primary applications over a network transport using one or more network protocols.

12. The system according to claim 11, wherein the designated backup application is configured to take over execution upon migration, and
wherein a synchronization point for the designated backup application is configured to exit the synchronization point upon completion of migration.

13. The system according to claim 11, wherein the designated backup application is configured to be the particular backup application, and
wherein the migration to the designated backup application is transmitted using a network protocol.

14. The system according to claim 10, wherein the particular backup application is chosen based on one of:
a preconfigured backup application, an operator-chosen backup application, or a backup application chosen based on available resources.

15. The system according to claim 10, wherein the designated backup application is addressed using one or more of:
a network Internet Protocol (IP) address of a new primary host, a fully qualified network host name for the new primary host, and virtual Internet Protocol (IP) addresses for the one or more primary applications.

16. The system according to claim 1, wherein the migration comprises one or more of:
checkpointing the one or more primary applications, terminating the one or more primary applications, copying the one or more primary applications checkpoints to one of the one or more backup hosts, and restoring the one or more primary applications from the checkpoints on the one of the one or more backup hosts.

17. The system according to claim 1, wherein the migration comprises one or more of:
checkpointing the one or more corresponding isolated environments, terminating the one or more primary applications in the one or more corresponding isolated environments, terminating the one or more corresponding isolated environments, copying the one or more corresponding isolated environments to one of the one or more backup hosts, and restoring the one or more corresponding isolated environments on the one of the backup hosts.

18. A non-transitory computer readable medium comprising instructions that when executed by a processor cause the processor to:
store and execute one or more primary applications;
wherein one or more backup hosts, each comprising computer system memory, are configured to store one or more isolated environments, each comprising one or more backup applications and one or more Central Processing Units operatively connected to the computer system memory and configured to execute the one or more backup applications;
wherein a synchronization point is configured to trigger, via one or more events, a migration of the one or more primary applications from the processor to the one or more backup applications on the one or more backup hosts.

19. A method, comprising:
halting an execution of one or more primary applications in one or more corresponding isolated environments upon arriving at a synchronization point; and
triggering a migration of the one or more primary applications and the one or more corresponding isolated environments to one or more backup applications when the execution of the one or more primary applications are halted at the synchronization point.

\* \* \* \* \*